US012478874B2

(12) United States Patent
Mizukami

(10) Patent No.: US 12,478,874 B2
(45) Date of Patent: Nov. 25, 2025

(54) COMPUTER-READABLE NON-TRANSITORY STORAGE MEDIUM HAVING GAME PROGRAM STORED THEREIN, GAME APPARATUS, GAME SYSTEM, AND GAME PROCESSING METHOD

(71) Applicant: NINTENDO CO., LTD., Kyoto (JP)

(72) Inventor: Akira Mizukami, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 343 days.

(21) Appl. No.: 18/303,290

(22) Filed: Apr. 19, 2023

(65) Prior Publication Data

US 2023/0381647 A1 Nov. 30, 2023

(30) Foreign Application Priority Data

May 24, 2022 (JP) ................................ 2022-084456

(51) Int. Cl.
*A63F 13/56* (2014.01)
*A63F 13/52* (2014.01)
*A63F 13/822* (2014.01)

(52) U.S. Cl.
CPC .............. *A63F 13/52* (2014.09); *A63F 13/56* (2014.09); *A63F 13/822* (2014.09); *A63F 2300/308* (2013.01)

(58) Field of Classification Search
CPC ......... A63F 13/52; A63F 13/56; A63F 13/822
See application file for complete search history.

(56) References Cited

U.S. PATENT DOCUMENTS 6,273,818 B1 * 8/2001 Komoto ................ A63F 13/833 463/31
6,283,861 B1 * 9/2001 Kawai ..................... A63F 13/57 463/43
12,064,693 B2 * 8/2024 Wan ........................ A63F 13/56
12,303,781 B2 * 5/2025 Wei ........................ A63F 13/426
2006/0068905 A1 * 3/2006 Umezaki ................. A63F 13/69 463/31
2007/0218965 A1 * 9/2007 Tilston .................... A63F 13/45 463/2
2017/0354885 A1 12/2017 Kitazono et al.
2022/0035515 A1 2/2022 Wan et al.
(Continued)

FOREIGN PATENT DOCUMENTS

JP 2003-079940 3/2003
JP 2003-079941 3/2003
JP 2003-079952 3/2003
(Continued)

*Primary Examiner* — Jay Trent Liddle
(74) *Attorney, Agent, or Firm* — Nixon & Vanderhye PC

(57) ABSTRACT

When there are a first number of first candidate objects in a first range close to a first object and there are a second number of second candidate objects in a second range far from the first object, the first object is caused to perform an action in one of (1) a first manner in which, before the action is performed with the second candidate object as a target, the action is performed with the first candidate object as a target a number of times that is equal to or less than the first number and (2) a second manner in which, before the action is performed with the first candidate object as a target, the action is performed with the second candidate object as a target a number of times that is equal to or less than the second number.

20 Claims, 21 Drawing Sheets

(56) References Cited

U.S. PATENT DOCUMENTS

| | | | | |
|---|---|---|---|---|
| 2022/0040580 | A1 * | 2/2022 | Wan | A63F 13/426 |
| 2023/0338845 | A1 * | 10/2023 | Ishii | A63F 13/5258 |

FOREIGN PATENT DOCUMENTS

| | | | |
|---|---|---|---|
| JP | 2003-079954 | | 3/2003 |
| JP | 2004-141435 | | 5/2004 |
| JP | 2010-279460 | | 12/2010 |
| JP | 2010279460 | A | 12/2010 |
| JP | 2017-217352 | | 12/2017 |
| WO | 2021/244322 | | 12/2021 |

* cited by examiner

FIG. 13
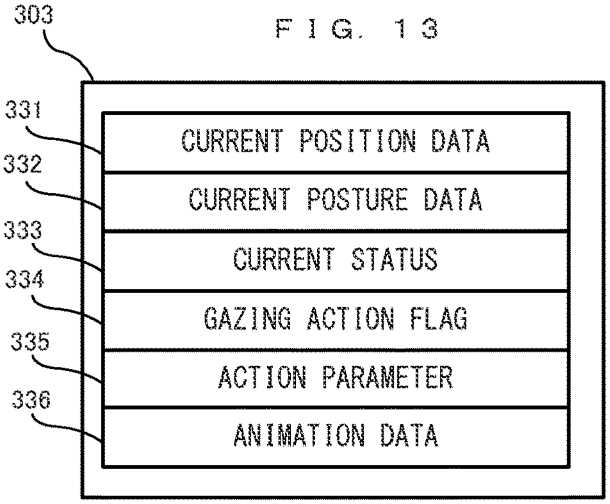
FIG. 15
305
351 352 353 352 353 352 353
| SHORT DISTANCE | | MIDDLE DISTANCE | | LONG DISTANCE | |
|---|---|---|---|---|---|
| NUMBER | SECOND OBJECT ID | NUMBER | SECOND OBJECT ID | NUMBER | SECOND OBJECT ID |
| 1 | 001 | 1 | 006 | 1 | 036 |
| 2 | 002 | 2 | 021 | 2 | 014 |
| 3 | 010 | 3 | 015 | 3 | 022 |
FIG. 16
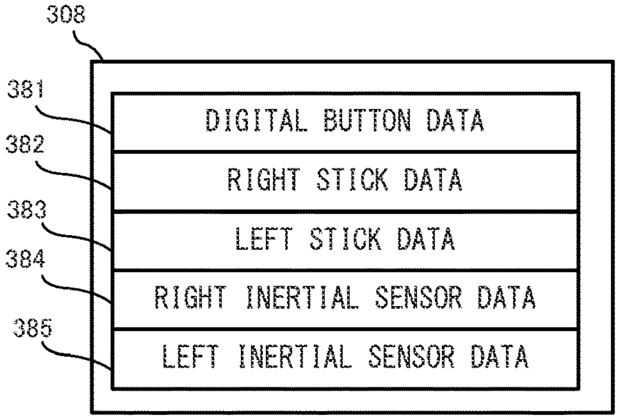

FIG. 14

304

| SECOND OBJECT ID (341) | POSITION INFORMATION (342) | POSTURE INFORMATION (343) | CANDIDATE FLAG (344) | ACTION TARGET FLAG (345) | FIRST COUNTER (346) | SECOND COUNTER (347) |
|---|---|---|---|---|---|---|
| 001 | (x, y, z) | (x, y, z) | OFF | OFF | 0:00:00 | 0:00:00 |
| 002 | (x, y, z) | (x, y, z) | ON | ON | 0:00:00 | 0:00:00 |
| 003 | (x, y, z) | (x, y, z) | ON | OFF | 0:00:00 | 0:00:00 |
| ... | ... | ... | ... | ... | ... | ... |

COMPUTER-READABLE NON-TRANSITORY STORAGE MEDIUM HAVING GAME PROGRAM STORED THEREIN, GAME APPARATUS, GAME SYSTEM, AND GAME PROCESSING METHOD

CROSS REFERENCE TO RELATED APPLICATION

This application claims priority to Japanese Patent Application No. 2022-084456 filed on May 24, 2022, the entire contents of which are incorporated herein by reference.

FIELD

The present disclosure relates to game processing in which a first object executes an action on one of a plurality of second objects.

BACKGROUND AND SUMMARY

Hitherto, games in which, for example, when an object that is an NPC targets another object for a predetermined action, a particular object is prevented from being unnaturally frequently targeted for the action, have been known. In such a game, when the NPC performs some action on a first object, an attention level of the first object is relatively decreased to make it easier for other objects to be selected as a target of the action.

In the above game, by decreasing an attention level, a certain object is prevented from being frequently targeted for the action. On the other hand, in the above game, the target of the action is determined according to the magnitudes of the distances between the NPC and the other objects. As a result, objects that exist at similar distances from the NPC are successively selected as the target of the action. Therefore, for example, if the NPC is an object representing a creature as a motif, an impression that the behavior and actions of the NPC are unnatural as those of a creature may be given to a player from the viewpoint of the distance from the NPC.

Therefore, an object of the present disclosure is to provide a computer-readable non-transitory storage medium having a game program stored therein, a game apparatus, a game system, and a game processing method that allow an object such as an NPC to behave naturally as a creature.

In order to attain the object described above, for example, the following configuration examples are exemplified.

(Configuration 1)

Configuration 1 is directed to a computer-readable non-transitory storage medium having stored therein a game program executed in a computer of an information processing apparatus, the game program causing the computer to:

place one first object and a plurality of second objects in a virtual space;

determine one or more second objects located in a first range relatively close to the first object and one or more second objects located in a second range relatively far from the first object among the plurality of second objects, as candidate objects that are target candidates of an action performed by the first object with a target being switched according to passage of time;

when, among the candidate objects, there are a first number of first candidate objects that are the candidate objects located in the first range, and there are a second number of second candidate objects that are the candidate objects located in the second range, cause the first object to perform the action in one of the following manners, a first manner in which, before the first object is caused to perform the action with the second candidate object as a target, the first object is caused to perform the action with the first candidate object as a target such that the number of times the action is performed is equal to or less than the first number, and then the first object is caused to perform the action with the second candidate object as a target, and a second manner in which, before the first object is caused to perform the action with the first candidate object as a target, the first object is caused to perform the action with the second candidate object as a target such that the number of times the action is performed is equal to or less than the second number, and then the first object is caused to perform the action with the first candidate object as a target; and generate a display image for displaying, on a screen, the virtual space including the first object.

According to the above configuration, the distance from the first object to the target of the action can be inhibited from being concentrated in a certain narrow range and can be varied in a wider range. Accordingly, natural behavior of the first object can be expressed.

(Configuration 2)

According to Configuration 2, in Configuration 1 described above, the game program may cause the computer to, when causing the first object to perform the action, associate, with each of the second objects, a timing after a timing when the action is started on the second object and before a timing when the action is next started on another second object, as a reference timing, and preferentially set the second object having a longer time elapsed from the reference timing, as a target of the action.

According to the above configuration, the second objects that have not been targeted for the action for a long time can be preferentially determined as targets of the action. Accordingly, various second objects can be determined as targets of the action.

(Configuration 3)

According to Configuration 3, in Configuration 1 or 2 described above, the game program may cause the computer to, when causing the first object to perform the action, store the second object including at least a candidate object targeted for the action, until the second object is no longer included in the candidate objects, and set the second object that has not been targeted for the action, as a target of the action in preference to the second object that has been targeted for the action.

According to the above configuration, the second object that has not been targeted for the action can be preferentially set as a target of the action. Accordingly, the same second object can be prevented from frequently becoming the target.

(Configuration 4)

According to Configuration 4, in Configuration 3 described above, the game program may cause the computer to, when causing the first object to perform the action, preferentially set the second object closer to the first object among the second objects that have not been targeted for the action, as a target of the action.

(Configuration 5)

According to Configuration 5, in Configuration 1 described above, the game program may cause the computer to cause the first object to perform the action on the first candidate object that is located closest to the first object and that is newly included in the first range from a state where the first candidate object is not included in the first range or the second range, when the first candidate object becomes newly included in the first range.

According to the above configuration, the first object can be caused to behave more naturally by performing the action on an object that has suddenly appeared in front of the first object.

(Configuration 6)

According to Configuration 6, in Configurations 1 to 5 described above, the game program may cause the computer to, when determining the candidate objects, determine, for each of the first range and the second range, the second object for which an angle between a forward direction of the first object and a direction from a position of the first object toward a position of the second object is smaller, as the candidate object in preference to the second object for which the angle is larger.

According to the above configuration, the second object in front of the first object is preferentially set as the candidate object. Accordingly, more natural behavior of performing the action on the second object in front of the first object, that is, the second object included in the field of view of the first object, can be expressed.

(Configuration 7)

According to Configuration 7, in Configuration 1 described above, the game program may cause the computer to, when determining the candidate objects, determine, for each of the first range and the second range, the second object that exists in a region extending at a predetermined angle so as to include a forward direction of the first object, as the candidate object in preference to the second object that does not exist in the region.

According to the above configuration, for example, the second object in a region corresponding to the field of view of the first object can be preferentially set as the candidate object. Accordingly, more natural behavior of the first object performing the action on the second object in the field of view of the first object, can be expressed.

(Configuration 8)

According to Configuration 8, in Configuration 7 described above, the game program may cause the computer to, when determining the candidate objects, for each of the first range and the second range, determine the second object closer to the first object among the second objects that exist in the region, as the candidate object in preference to the second object farther from the first object.

(Configuration 9)

According to Configuration 9, in Configurations 1 to 8 described above, the first object may be an object including at least a body, a face, or eyes, and the game program may cause the computer to, when causing the first object to perform the action, cause the first object to perform, with the first candidate object or the second candidate object as a target, the action in which the body, the face, or a gaze of the first object is directed toward the target.

According to the above configuration, it is possible to present which second object is the action target in a way that is easy for the player to grasp.

(Configuration 10)

According to Configuration 10, in Configurations 1 to 9 described above, the game program may cause the computer to, when causing the first object to perform the action, restrict the first object from successively performing the action on the same second object.

According to the above configuration, the same second object can be prevented from being set as an action target, thus promoting even distribution of action targets.

(Configuration 11)

According to Configuration 11, in Configurations 1 to 9 described above, the game program may cause the computer to, when causing the first object to perform the action, cause the first object to successively perform the action in the first manner, with one of the first candidate objects as a target, a number of times that is equal to or less than the first number.

According to the above configuration, the first object can be caused to behave more naturally according to the nature and characteristics of the action to be executed, such as a "barking" action.

(Configuration 12)

According to Configuration 12, in Configurations 1 to 11 described above, the game program may cause the computer to, when determining the candidate objects, determine the second objects whose number is equal to or less than 10, as the candidate objects.

According to the above configuration, by preventing the number of candidate objects from excessively increasing, it is easier for the player to understand that a second object is determined as a target of the action such that the distance from the first object thereto is not concentrated in a certain narrow range and is varied in a wider range. Accordingly, the player can be prevented from feeling that the behavior of the first object is unnatural.

(Configuration 13)

According to Configuration 13, in Configurations 1 to 12 described above, the game program may cause the computer to, when causing the first object to perform the action, determine the second objects as the candidate objects such that the first number and the second number are equal to each other.

According to the above configuration, for the second objects in the first range and the second range, the target of the action can be evenly distributed.

(Configuration 14)

According to Configuration 14, in Configuration 13 described above, the game program may further cause the computer to change a position of the first object placed in the virtual space.

According to the above configuration, the second objects that are the candidate objects can be switched by a change in a positional relationship caused by changing the position of the first object.

(Configuration 15)

According to Configuration 15, in Configuration 14 described above, the game program may cause the computer to, when changing the position of the first object, change the position of the first object such that the first object follows a player character operated by a player.

(Configuration 16)

According to Configuration 16, in Configurations 1 to 15 described above, the game program may further cause the computer to change positions of the second objects placed in the virtual space.

According to the above configuration, the second objects that are the candidate objects can be changed by moving the second objects. Accordingly, various second objects can be set as targets of the action.

(Configuration 17)

According to Configuration 17, in Configurations 1 to 16 described above, the game program may cause the computer to determine the candidate objects every predetermined cycle.

According to the above configuration, if the position of the candidate object has changed, the change in the position can be reflected.

According to the present disclosure, the distance from the first object to the target of the action can be inhibited from being concentrated in a certain narrow range and can be varied in a wider range. Accordingly, natural behavior of the first object can be expressed.

BRIEF DESCRIPTION OF THE DRAWINGS

FIG. 13 shows a non-limiting example of first object data 303;

FIG. 14 shows a non-limiting example of second object data 304;

FIG. 15 shows a non-limiting example of a candidate database 305;

FIG. 16 shows a non-limiting example of operation data 308;

DETAILED DESCRIPTION OF NON-LIMITING EXAMPLE EMBODIMENTS

Hereinafter, an exemplary embodiment will be described. It is to be understood that, as used herein, elements and the like written in singular form with a word "a" or "an" attached before them do not exclude those in the plural form.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
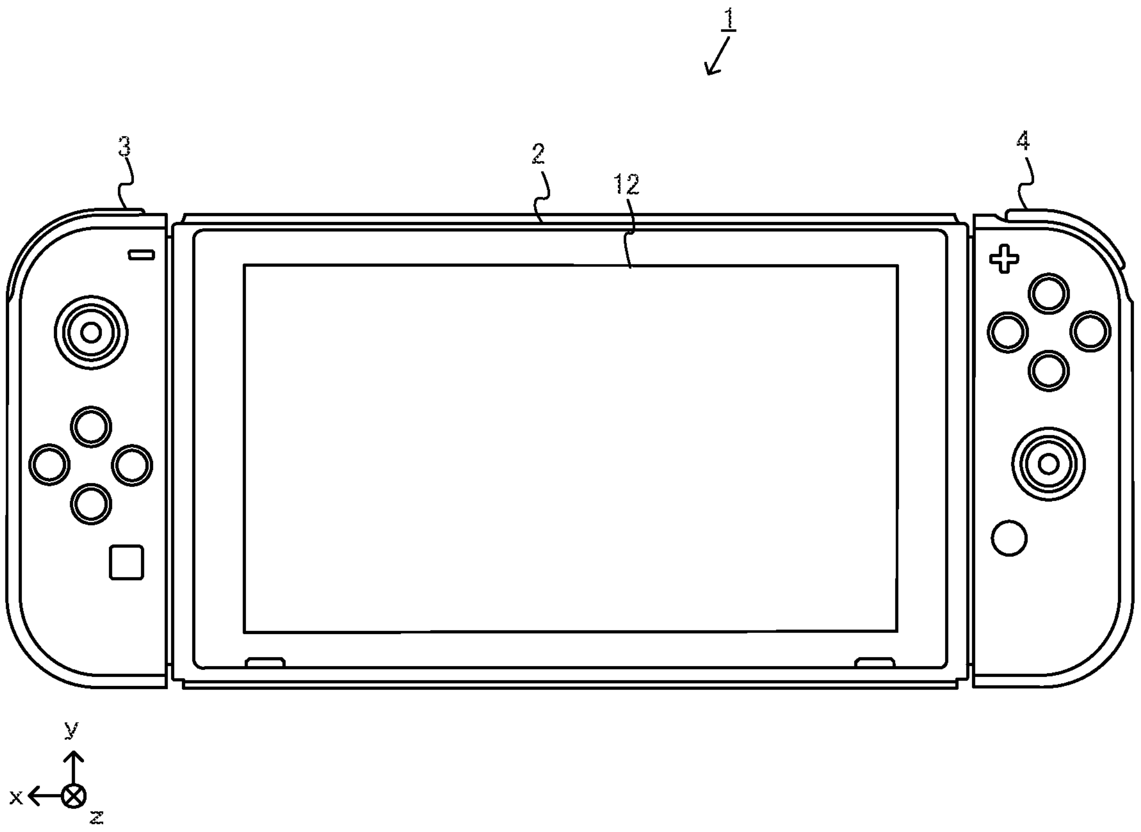
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a player provides inputs.

Figure 2:
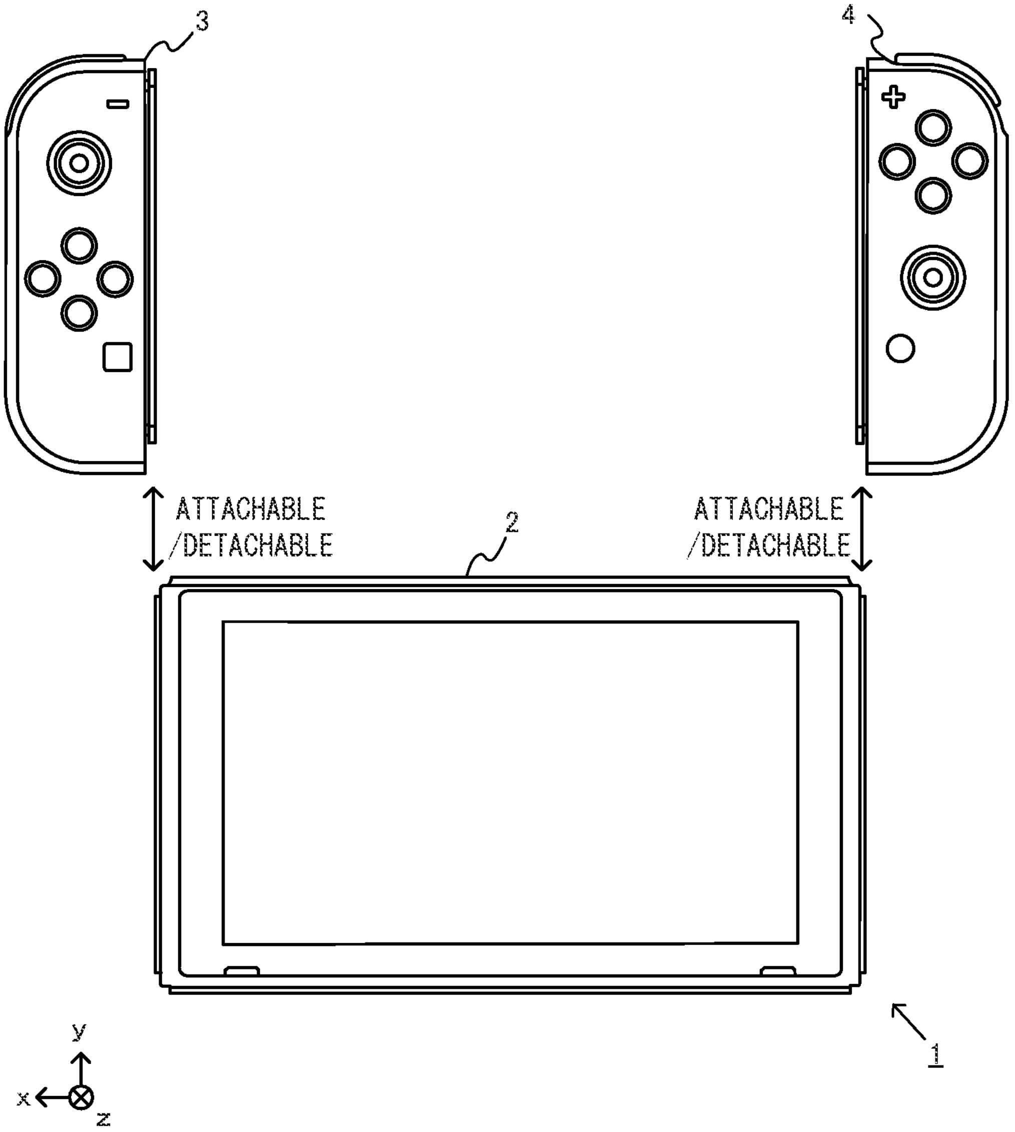
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

Figure 3:
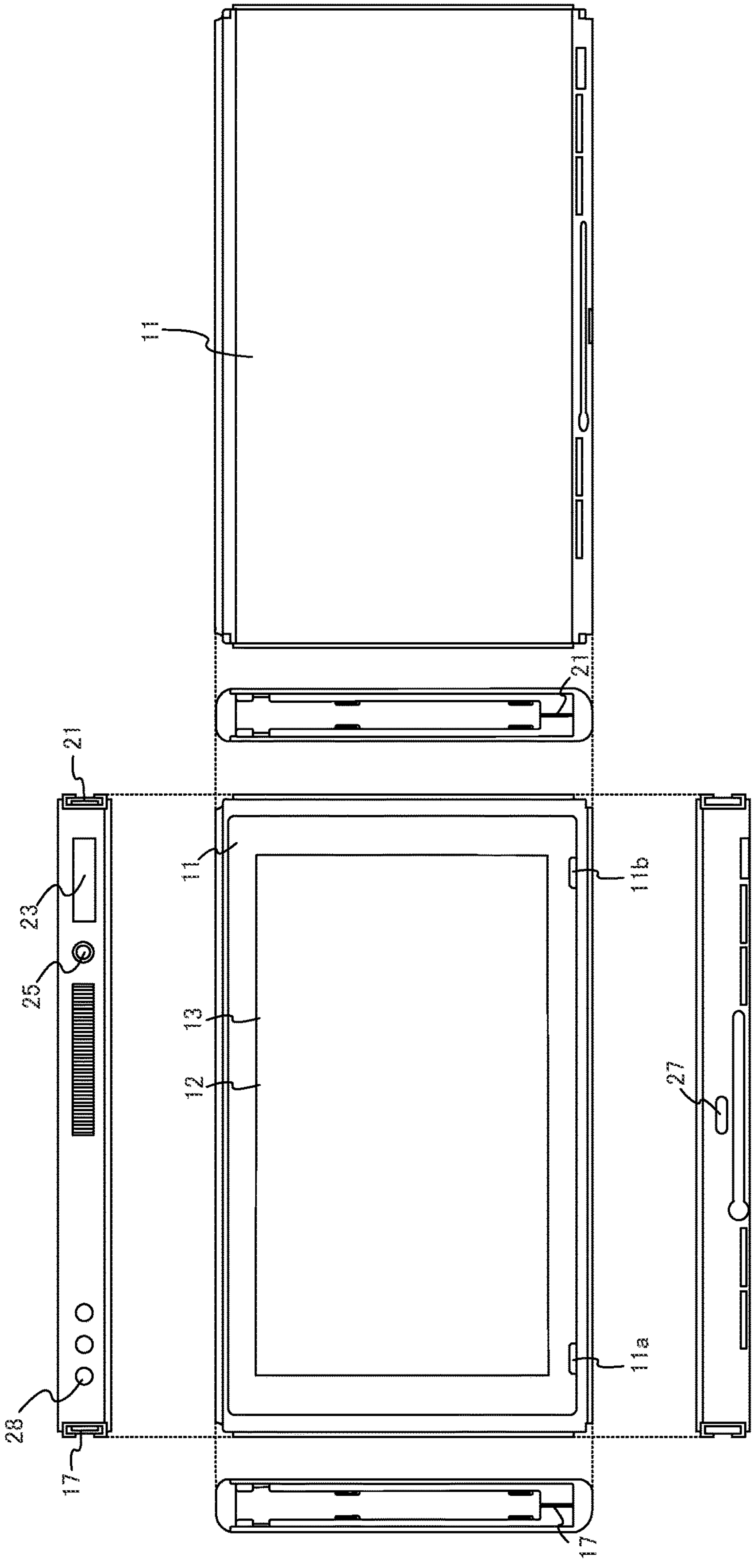
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11*a* and 11*b* are formed in the main surface of the housing 11. Then, sounds outputted from the speakers 88 are outputted through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
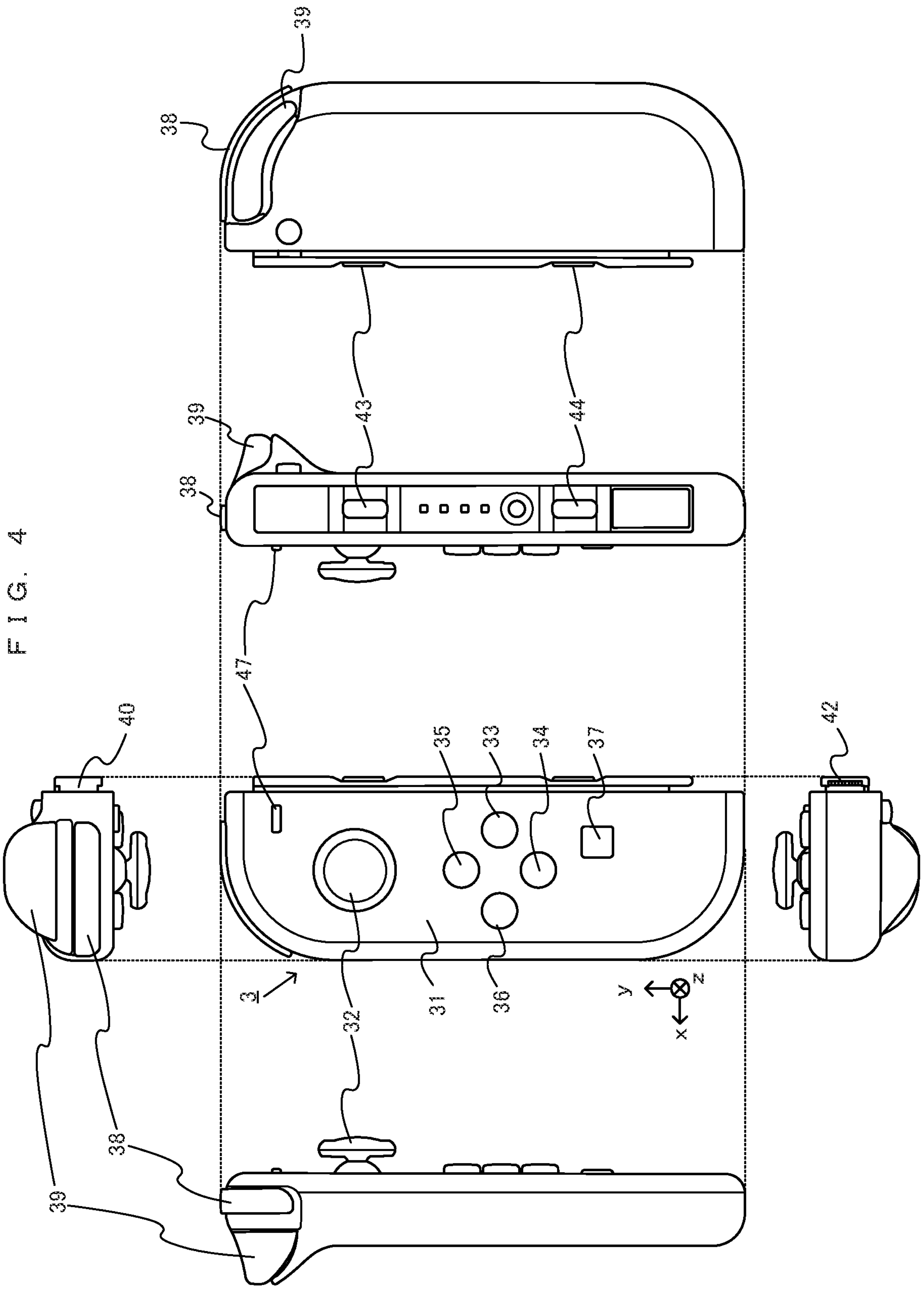
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The player tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick.

Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
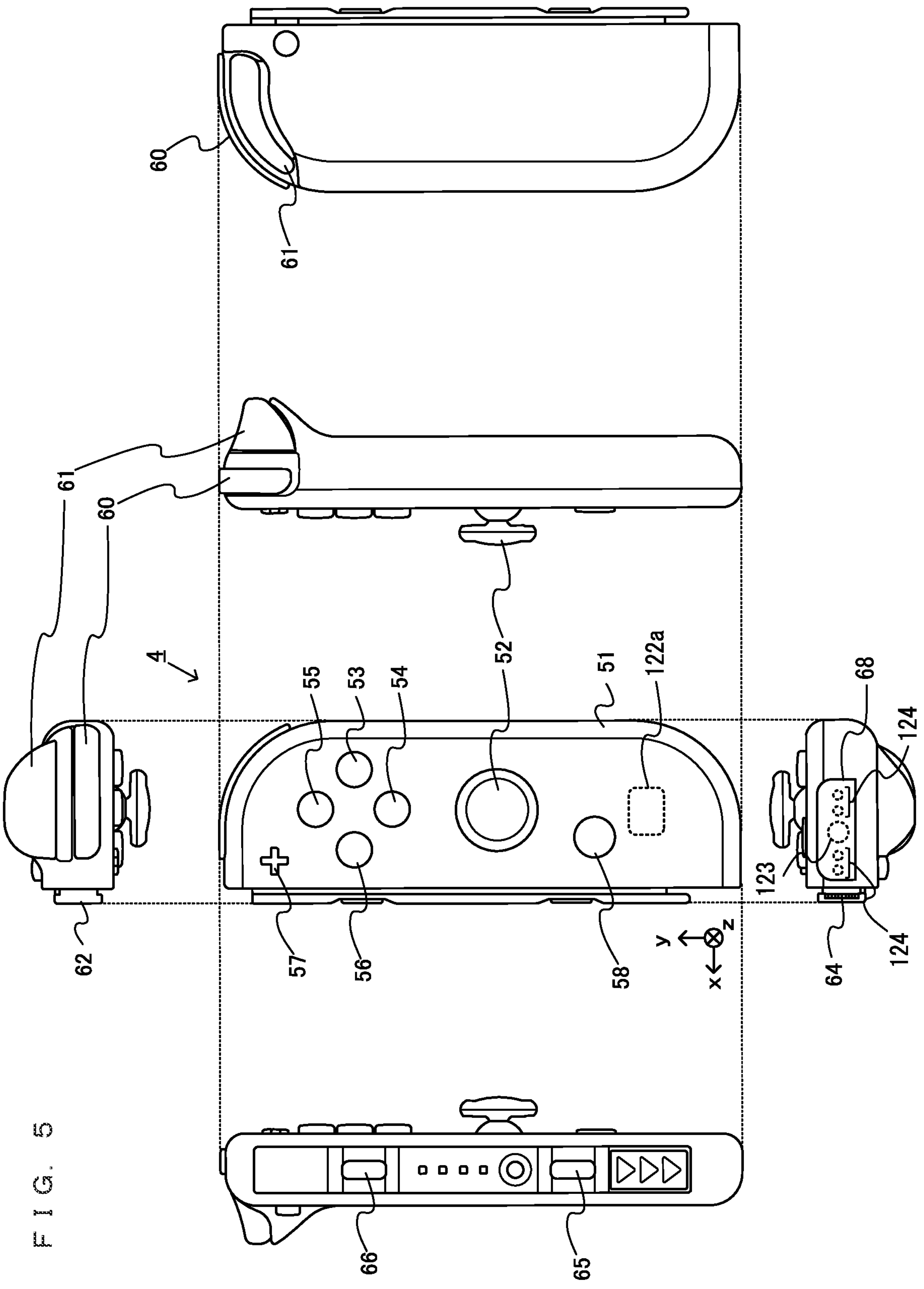
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
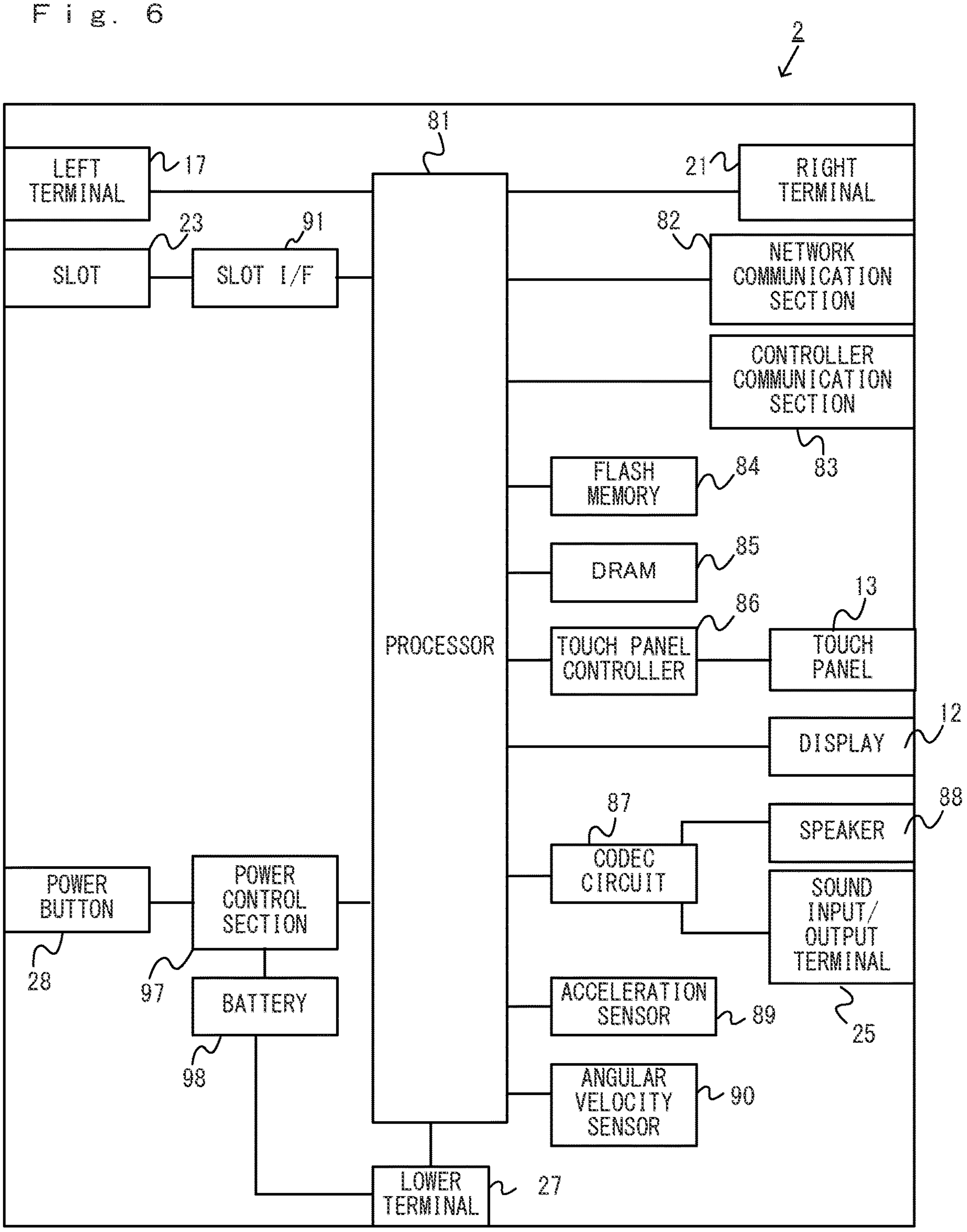
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of players can simultaneously provide inputs to the main body apparatus 2, each using a set of the left controller 3 and the right controller 4. As an example, a first player can provide an input to the main body apparatus 2 using a first set of the left controller 3 and the right controller 4, and simultaneously, a second player can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
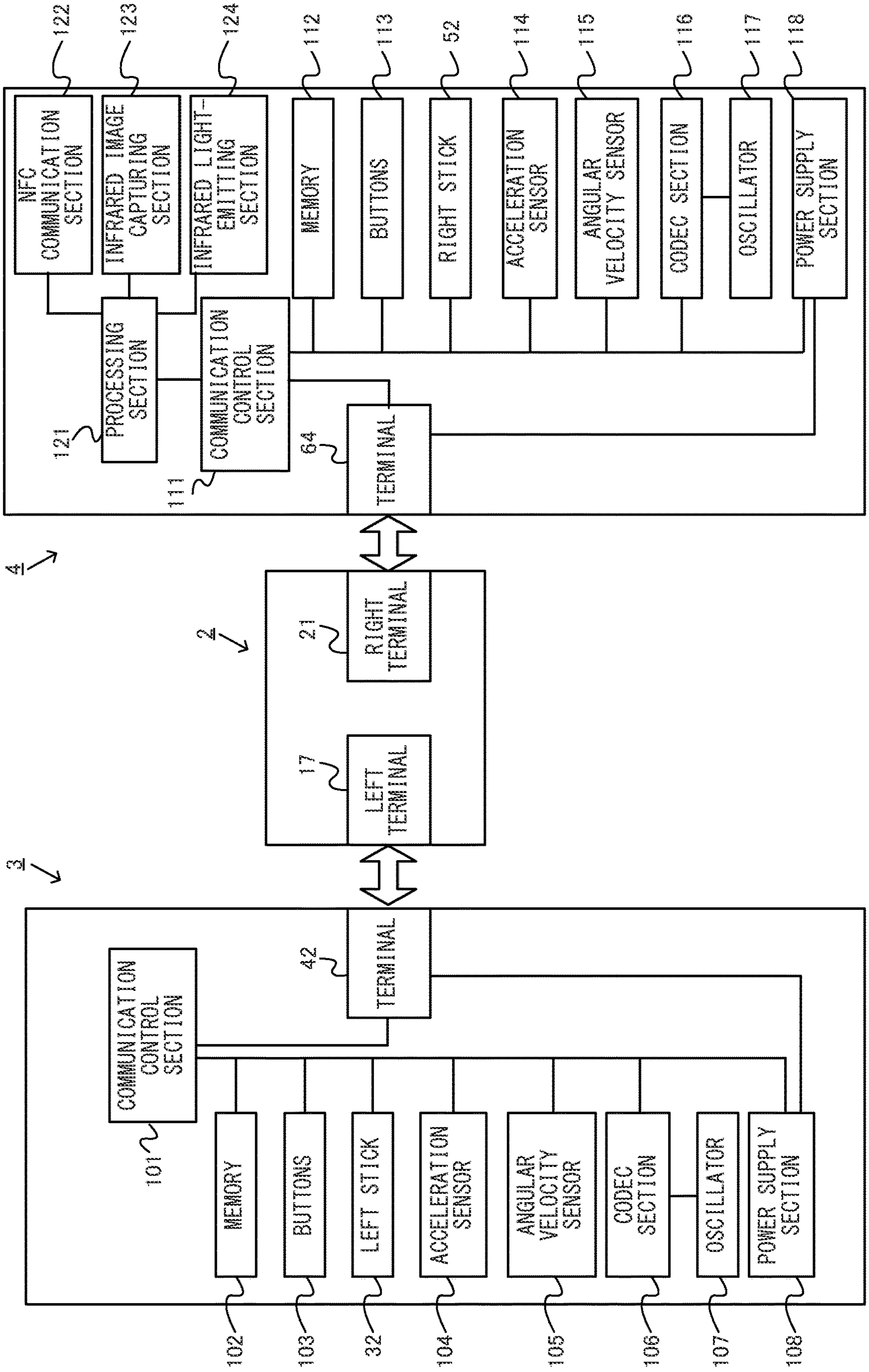
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing in Exemplary Embodiment]

Next, the outline of operation of the game processing executed by the game system 1 according to the exemplary embodiment will be described. As described above, in the game system 1, the main body apparatus 2 is configured such that each of the left controller 3 and the right controller 4 is attachable thereto and detachable therefrom. In a case of playing the game with the left controller 3 and the right controller 4 attached to the main body apparatus 2, a game image is outputted to the display 12. In a case where the main body apparatus 2 alone with the left controller 3 and the right controller 4 detached therefrom is mounted on the cradle, the main body apparatus 2 can output a game image to a stationary monitor or the like via the cradle. In the exemplary embodiment, the case of playing the game in the latter manner will be described as an example. Specifically, the main body apparatus 2 alone with the left controller 3 and the right controller 4 detached therefrom is mounted on the cradle, and the main body apparatus 2 outputs a game image and the like to a stationary monitor or the like via the cradle.

[Screen Examples]

Figure 8:
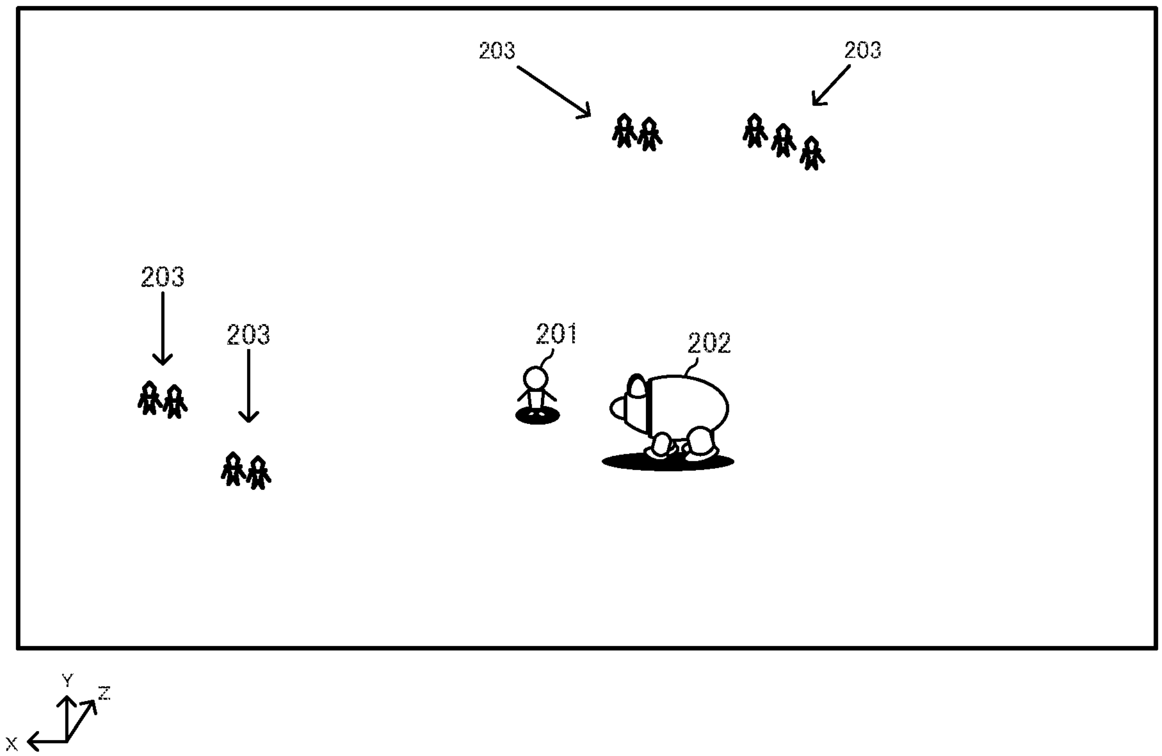
FIG. 8 shows a non-limiting example of a game screen according to an exemplary embodiment.

FIG. 8 shows an example of a screen of the game generated by taking, with a virtual camera, an image of a virtual game space that is a stage for the game. In the exemplary embodiment, the case where the virtual game space is a three-dimensional space is taken as an example, but in another exemplary embodiment, the virtual game space may be a two-dimensional space. In FIG. 8, a player character object (hereinafter, referred to as PC) 201 and a first object 202 are displayed. The PC 201 is a humanoid object that is an operation target of the player. The first object 202 is an NPC that supports the PC 201, and is a character object representing a quadrupedal animal with eyes, a face, and a body, as a motif. In addition, basically, the first object 202 automatically moves so as to follow the movement of the PC 201. Furthermore, the first object 202 can also attack a predetermined enemy object in response to an attack command operation of the player. Also, by performing a predetermined operation for switching the operation target, the player can set the first object as the operation target. In this case, the player can also perform a movement operation, etc., directly for the first object 202.

Furthermore, in FIG. 8, a plurality of second objects 203 are also displayed. The second objects 203 are a collective term for character objects other than the PC 201 and the first object 202. For example, the second objects 203 include types such as "enemy objects" and "association objects". An enemy object is a character object that acts autonomously and attacks the PC 201. Also, an association object is a character object that becomes an ally of the PC 201. An association object is a character that is associated with the PC 201 and automatically moves so as to follow the movement of the PC 201. In the example in FIG. 8, the case where the second objects 203 are association objects is illustrated. Here, in the game of the exemplary embodiment, the association objects are scattered on a field within the virtual game space. For example, the player performs a predetermined operation in a state where the PC 201 is close to a predetermined association object. Accordingly, this association object can be associated with the PC 201 and caused to move so as to follow the PC 201 (specifically, the association object can be added to a "party" including the PC 201 as a leader).

As described above, in the game, the second objects such as association objects and enemy objects are scattered on the field within the virtual game space. In the exemplary embodiment, control in which the first object 202 performs a predetermined action on these second objects 203, is performed. In the exemplary embodiment, a description will be given with the case of performing an action of "directing a gaze" as an example of the predetermined action (hereinafter, this action is referred to as gazing action). That is, processing described in the exemplary embodiment relates to control for directing a gaze. Specifically, in the exemplary embodiment, control is performed such that gazing points are distributed without being unevenly distributed to a specific distance zone (range of distance).

This control is executed when the state of the first object 202 in the game is a predetermined state. In the exemplary embodiment, it is assumed that there are three states of the first object 202 in the game, "moving", "waiting", and "attacking". The "moving" state is a state where the first object 202 is moving (so as to follow the PC 201), and the "attacking" state is a state where the first object 202 is performing an attacking action against a predetermined enemy object. Also, the "waiting" state is a state where the first object 202 is neither moving nor attacking, and is typically a state where the first object 202 is staying in place. In the exemplary embodiment, in the "waiting" or "moving" state, control in which the first object 202 performs the gazing action on (directs its gaze toward) the second objects 203 around the first object 202, is performed.

Figure 9:
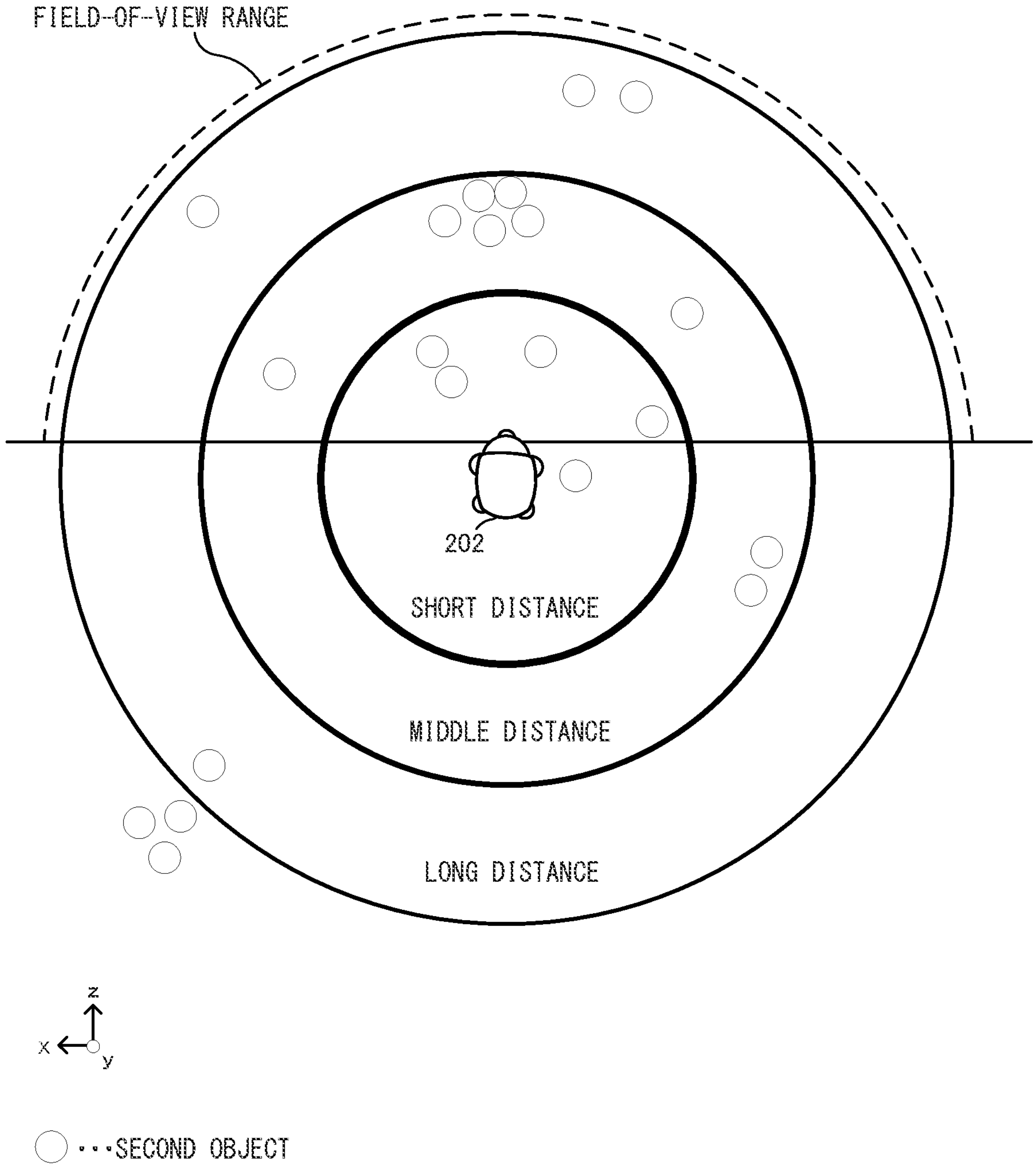
FIG. 9 illustrates a non-limiting example of an outline of processing according to the exemplary embodiment.
Figure 10:
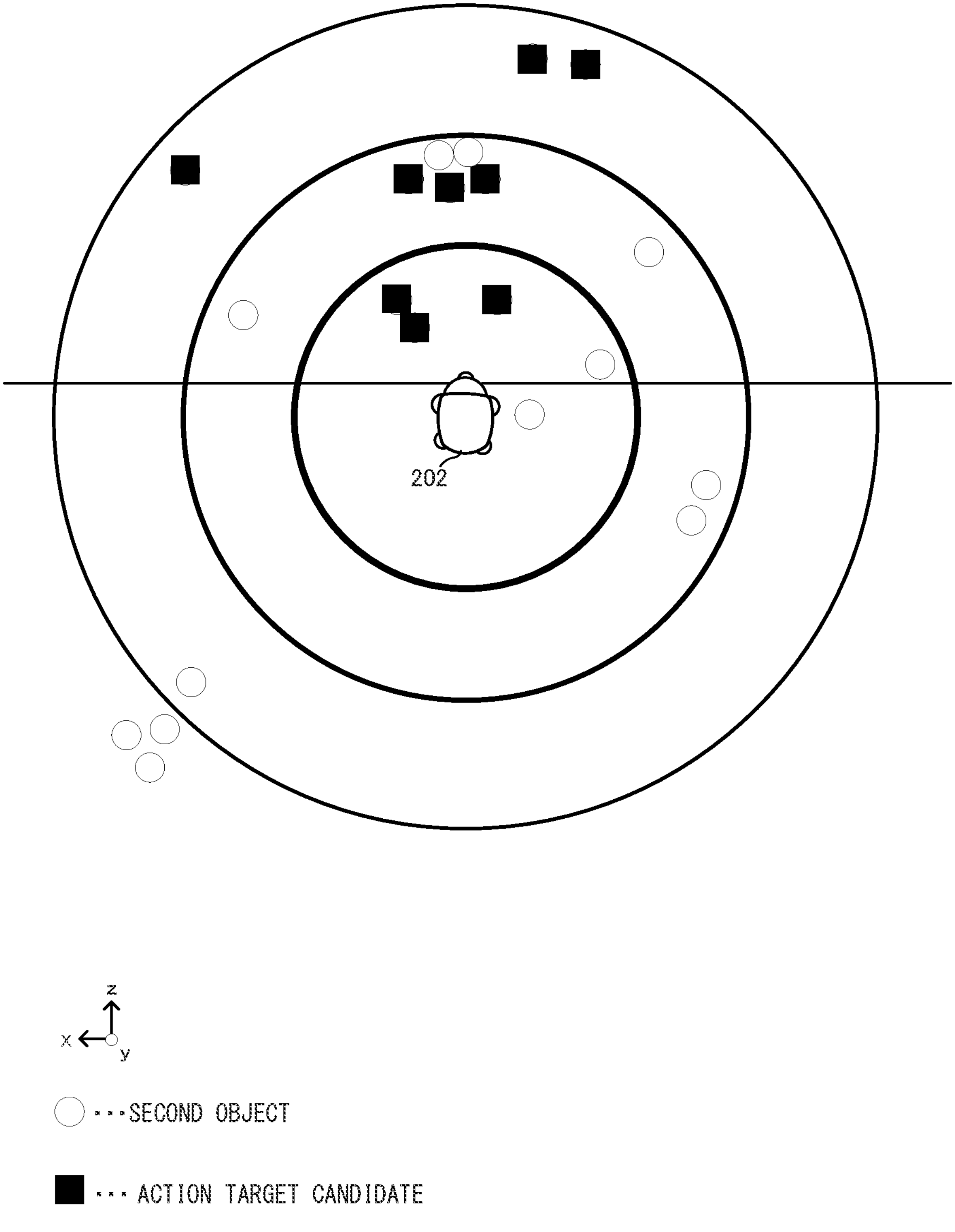
FIG. 10 illustrates a non-limiting example of the outline of the processing according to the exemplary embodiment.
Figure 11:
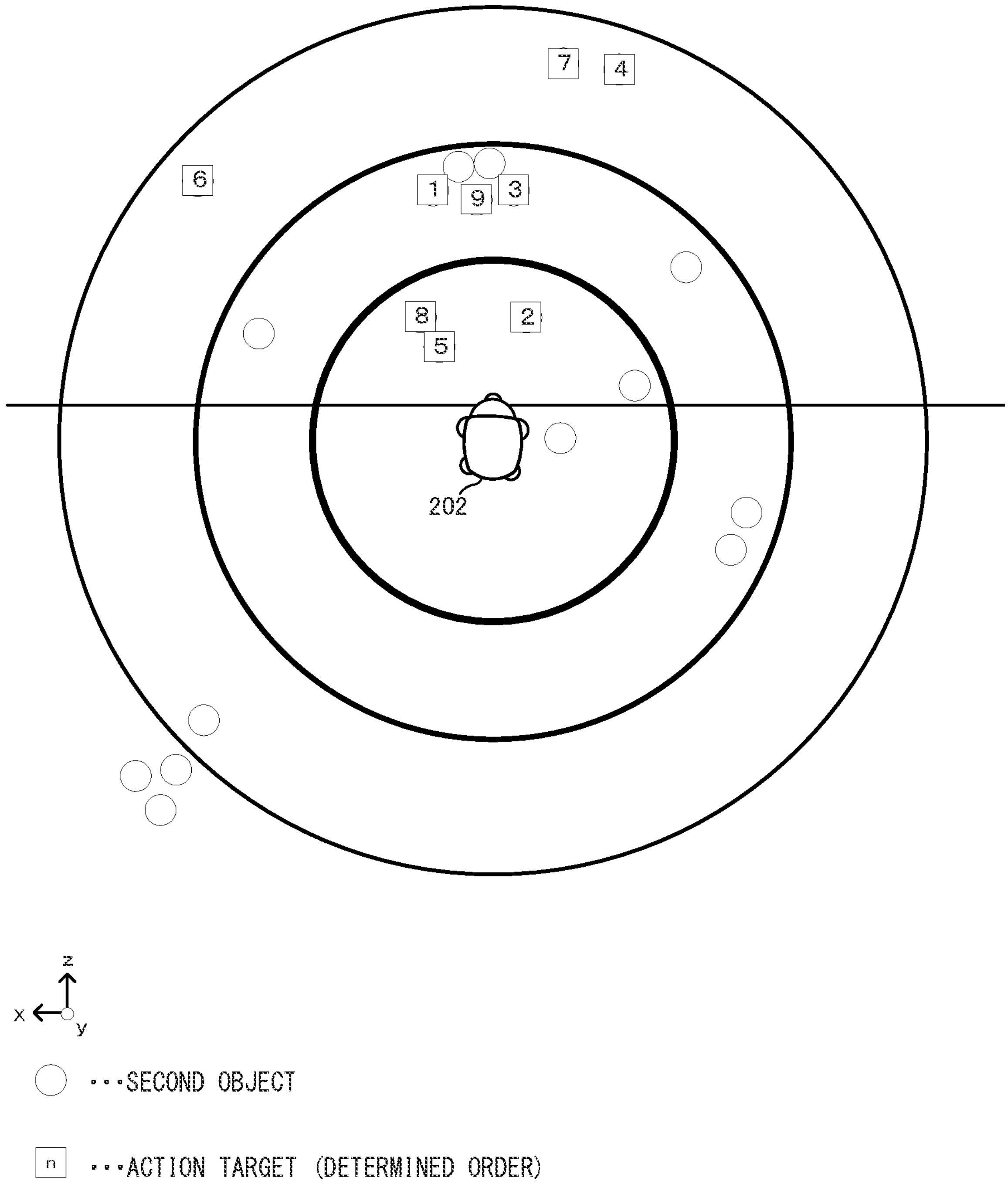
FIG. 11 illustrates a non-limiting example of the outline of the processing according to the exemplary embodiment.
Figure 12:
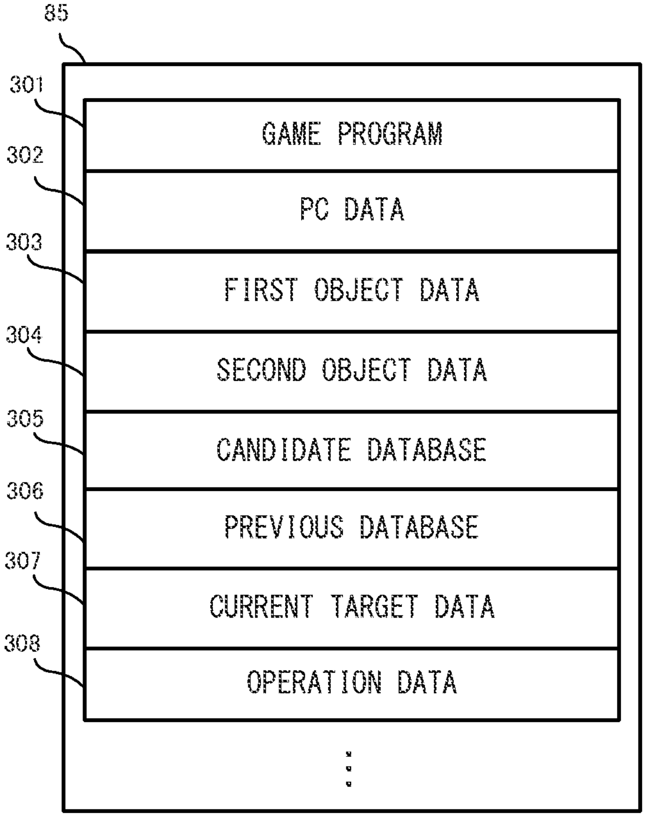
FIG. 12 illustrates a memory map showing a non-limiting example of various kinds of data stored in a DRAM 85.

Next, an outline and principle of a gaze control process in the exemplary embodiment will be described with reference to FIG. 9 to FIG. 11. FIG. 9 to FIG. 11 are schematic diagrams showing a predetermined range, centered on the first object 202, of the virtual game space as viewed from above. In FIG. 9, the first object 202 is in a state where the first object 202 is facing in the z-axis positive direction. A plurality of second objects 203 (shown by circles in FIG. 9) exist around the first object 202. In the exemplary embodiment, control in which an object toward which the first object 202 directs its gaze is determined from the plurality of second objects 203, is performed. Specifically, a predetermined number of second objects 203 are selected from among these second objects 203 as "candidates" (hereinafter, referred to as action target candidates) toward which the first object 202 directs its gaze. Then, control in which a "target" (hereinafter, referred to as action target) toward which the first object 202 actually directs its gaze is selected from among these "candidates" through control described later and the first object 202 directs its gaze toward the target for a predetermined time, is performed. Hereinafter, an outline of methods for selecting and determining these "action target candidates" and the "action target" will be described.

[Surrounding Search]

In the exemplary embodiment, first, the second objects 203 around the first object 202 are searched for. Then, the second objects 203 found as a result of the search are classified into three types of distance zones according to the positions thereof. Specifically, a predetermined range centered on the first object 202 is classified into three types of ranges, "short distance", "middle distance", and "long distance" (hereinafter, collectively referred to as distance category). In the example in FIG. 9, the "short distance" is set as a circular range, and the "middle distance" and the "long distance" are set as donut-shaped ranges. The short distance is a range closest to the first object 202, and the middle distance is a range relatively farther from the first object 202 than the short distance. The long distance is a range relatively farther from the first object 202 than the short distance and the middle distance. In the exemplary embodiment, the second objects 203 within the predetermined range are searched for at a predetermined cycle, and are each classified into one of these three ranges.

Here, on the forward (z-axis positive direction in FIG. 9) side of the first object 202, a range having a predetermined angle is defined with the head of the first object 202 as a base point. FIG. 9 illustrates the case where the predetermined angle is 180 degrees as an example. This angle also corresponds to the "field of view" of the first object 202. In the following description, of the predetermined range centered on the first object 202, the range included in the angle of 180 degrees on the forward side is referred to as "field-of-view range". In the exemplary embodiment, control in which the second objects 203 included in the field-of-view range are preferentially selected as "action target candidates" from the results of the above search, is performed.

[Method for Selecting Action Target Candidates]

Next, the method for selecting the action target candidates from the search results will be described in more detail. In the exemplary embodiment, up to three second objects 203 are selected as the action target candidates from each distance category described above. In addition, in this selection, second objects 203 are selected in the order of second objects 203 having a shorter linear distance from the first object 202 among the second objects 203 included in the field-of-view range. Therefore, for example, if there are four or more second objects 203 in the "short distance" range, three second objects 203 are selected in the order of second objects 203 having a shorter linear distance from the first object 202. FIG. 10 shows an example of the section of the action target candidates. In FIG. 10, the second objects 203 selected as the action target candidates are shown by black squares. As shown in FIG. 10, in the "short distance" range, three objects out of the four second objects 203 within the field-of-view range are selected as the action target candidates. Similarly, in the "middle distance" range, three objects having a shorter linear distance, out of seven second objects 203 within the field-of-view range, are selected as the action target candidates. In the "long distance" range, there are three second objects 203 within the field-of-view range, so that these second objects 203 are all selected as the action target candidates.

If the number of second objects 203 in a predetermined distance category is less than three, a second object(s) 203 is selected as a candidate(s) in the order of second objects 203 having a shorter linear distance, from among the second objects 203 that are in the same distance category but outside the field-of-view range. That is, in the exemplary embodiment, a process in which the number of candidates becomes three as much as possible is performed for each distance category. However, if, outside the field-of-view range, there is no second object 203 that can be a candidate, the number of candidates in the distance category may be less than three.

As for the candidate selection, in another exemplary embodiment, the second objects 203 outside the field-of-view range may not necessarily be selected as candidates.

[Method for Determining Action Target]

Next, a process of determining the action target from the above action target candidates will be described. In the exemplary embodiment, for each second object that has become an action target candidate, a "time for which the gaze is not directed" toward the second object (hereinafter, referred to as "non-gazing time") is counted. Then, when determining the action target, the action target candidate having the longest non-gazing time is determined as the action target. The gazing action is started on the determined action target. When the gazing action is started, for the second object 203 toward which the gaze is directed, a "time for which the gaze is directed" toward the second object 203 (hereinafter, referred to as "gazing time") is counted. At this time, the counting of the non-gazing time is stopped, and the counter thereof is also reset. After that, when the gazing action is performed for a predetermined time, the gazing action on the action target is ended. As for the gazing time, in the exemplary embodiment, adjustment is performed such that the longer the distance to the second object 203, the longer the gaze is directed toward the second object 203. This adjustment is performed in consideration of the naturalness of gazing behavior.

After the gazing action is ended, the action target candidate having the longest non-gazing time at that time is determined as the next action target. In addition, the action target on which the gazing action has been ended returns to an action target candidate, and counting of the non-gazing time thereof is started again.

By repeating the process of determining the action target on the basis of the non-gazing time as described above, the gazing action can be performed, for example, in the order shown in FIG. 11 (if the positional relationship between the first object 202 and each second object 203 remains unchanged). In FIG. 11, the order in which the gaze is directed (as a result) is shown by numbers in squares. As described above, the maximum number of action target candidates for each distance category is set to three. Therefore, the gaze can be prevented from being unevenly directed to a certain distance category, and can be evenly distributed to the respective distance categories. For example, FIG. 9 to FIG. 11 show an example in which five second objects 203 are grouped almost in front of the first object 202 in the middle distance range. In such a situation, it is assumed that the processing as in the exemplary embodiment is not performed, and, for example, an action target is simply determined at random from the second objects 203 within the field-of-view range. In this case, the first object 202 may behave such that the gazing action is performed unevenly on the group of the five second objects 203 (in the middle distance range) by the first object 202. However, with the processing of the exemplary embodiment, even in such a case, the target of the gazing action (toward which the gaze is directed) can be inhibited from being unevenly distributed to a certain distance category and can be evenly distributed. In particular, in the case where the game is a game in which second objects 203 are often scattered on a field so as to be grouped to some extent due to the nature of the game, it is also assumed that, for example, ten or more second objects 203 are grouped instead of the above five second objects 203. In such a case as well, with the processing of the exemplary embodiment, the target toward which the gaze is directed can be inhibited from being unevenly distributed to the distance category where a group of the ten or more second objects 203 is present, and can be evenly distributed to the distance categories.

Also, by determining the action target on the basis of the non-gazing time as described above, the same second object 203 can be inhibited from being successively determined as the action target. Therefore, various second objects 203 can be determined as the action target.

In addition to the above control, in the exemplary embodiment, the following control is also performed as described in detail later. That is, when a situation in which "a second object 203 has suddenly appeared in front of the first object 202" occurs, control in which this second object 203 is urgently set as the action target regardless of the above-described non-gazing time, is also performed. Accordingly, the first object 202 can be caused to behave naturally so as to "direct its gaze toward an object that has suddenly appeared in front". In the following description, such a "second object that has suddenly appeared" is referred to as "interrupting object".

[Details of Game Processing of Exemplary Embodiment]

Next, the game processing in the exemplary embodiment will be described in detail with reference to FIG. 12 to FIG. 22. Here, the above processing related to gaze control will be described, and the detailed description of other game processing is omitted.

[Data to be Used]

Figure 20:
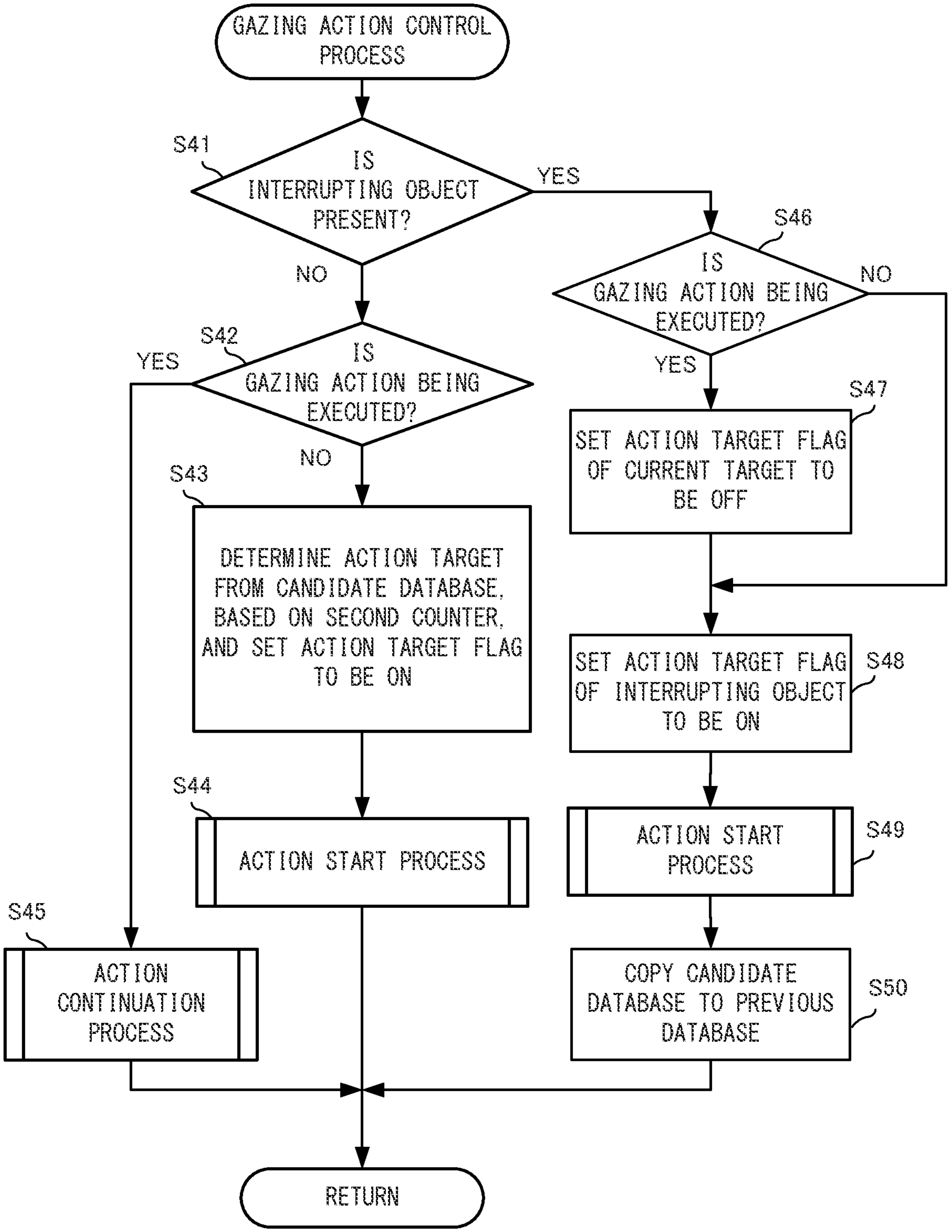
FIG. 20 is a non-limiting example flowchart showing the details of a gazing action control process.

First, various kinds of data to be used in the game processing will be described. FIG. 20 illustrates a memory map showing an example of various kinds of data stored in the DRAM 85 of the main body apparatus 2. In the DRAM 85 of the main body apparatus 2, a game program 301, PC data 302, first object data 303, second object data 304, a candidate database 305, a previous database 306, current target data 307, operation data 308, etc., are stored.

The game program 301 is a program for executing the game processing in the exemplary embodiment.

The PC data 302 is data regarding the above PC 201. The PC data 302 includes data indicating the position and posture of the PC 201, data indicating the state of the PC 201 in the game, etc.

The first object data 303 is data regarding the above first object 202. FIG. 13 illustrates an example of the data structure of the first object data 303. The first object data 303 includes current position data 331, current posture data 332, a current status 333, a gazing action flag 334, an action parameter 335, animation data 336, etc.

The current position data 331 and the current posture data 332 are data indicating the current position and the current posture of the first object 202 in the virtual game space. For example, as information indicating the current position, three-dimensional coordinates in the virtual game space are stored in the current position data 331. In addition, as information indicating the current posture of the first object 202, vector data indicating vectors in x-, y-, and z-axes in a local coordinate system of the first object 202, respectively, etc., are stored in the current posture data 332.

The current status 333 is data indicating the current state of the first object 202. In the exemplary embodiment, information indicating any of "waiting", "moving", and "attacking" can be set as described above.

The gazing action flag 334 is a flag for indicating whether or not the first object 202 is performing the gazing action on a predetermined action target.

The action parameter 335 is data used to control the movement of the first object 202. For example, the action parameter 335 includes parameters indicating the movement direction, the movement speed, etc., of the first object 202.

The animation data 336 is data that defines animations of various actions performed by the first object 202. Specifically, an animation corresponding to the state indicated by the current status 333, and data of an animation related to the gazing action are defined.

Referring back to FIG. 12, the second object data 304 is data regarding the above second objects 203. FIG. 14 illustrates an example of the data structure of the second object data 304. The second object data 304 is a database configured such that one record corresponds to one second object 203. This record includes at least items such as a second object ID 341, position information 342, posture information 343, a candidate flag 344, an action target flag 345, a first counter 346, and a second counter 347. In addition, each record may include action parameters for performing action control of each second object 203, type data indicating the type of the second object 203, image data indicating the appearance of the second object 203, etc., which are not shown.

The second object ID 341 is an ID for uniquely identifying each second object 203. The position information 342 is information indicating the current position of the second object 203 in the virtual game space. The posture information 343 is information indicating the current posture of the second object 203. The candidate flag 344 is a flag indicating whether or not the second object 203 is the above action target candidate. The action target flag 345 is a flag indicating whether or not the second object 203 is the above action target. The first counter 346 is a counter for counting the above gazing time. The second counter 347 is a counter for counting the above non-gazing time.

Referring back to FIG. 12, the candidate database 305 is a database indicating the current action target candidates. FIG. 15 illustrates an example of the data structure of the candidate database 305. The candidate database 305 has items such as "short distance", "middle distance", and "long distance" as a distance category 351, and has items such as a number 352 and a second object ID 353 for each distance category 351. As described above, when selecting the action target candidates, objects are selected in the order of objects having a shorter distance to the first object 202 among the objects included in the field-of-view range. The number 352 indicates the number of each record, and is also a number corresponding to the order of having a shorter distance. In this example, the number 352 is assumed to be in ascending order of distance. Therefore, the first record in the "short distance" is a record indicating the second object 203 closest to the first object 202. In addition, the second object ID 353 is information for identifying the second object 203 related to each record, and is an ID corresponding to the second object ID 341 of the second object data 304.

Referring back to FIG. 12, the previous database 306 is a database obtained by copying the contents of the candidate database 305. In processing described later, the previous database 306 and the candidate database 305 are compared to determine the occurrence of changes in action target candidates, etc.

The current target data 307 is data indicating the second object 203 that is currently the action target. In the current target data 307, the second object ID 341 of the current action target is stored.

The operation data 308 is data obtained from the controller operated by the player. That is, the operation data 308 is data indicating the content of an operation performed by the player. FIG. 16 illustrates an example of the data structure of the operation data 308. The operation data 308 includes at least digital button data 381, right stick data 382, left stick data 383, right inertial sensor data 384, and left inertial sensor data 385. The digital button data 381 is data indicating pressed states of various buttons of the controllers. The right stick data 382 is data for indicating the content of an operation on the right stick 52. Specifically, the right stick data 382 includes two-dimensional data of x and y. The left stick data 383 is data for indicating the content of an operation on the left stick 32. The right inertial sensor data 384 is data indicating the detection results of the inertial sensors such as the acceleration sensor 114 and the angular velocity sensor 115 of the right controller 4. Specifically, the right inertial sensor data 384 includes acceleration data for three axes and angular velocity data for three axes. The left inertial sensor data 385 is data indicating the detection results of the inertial sensors such as the acceleration sensor 104 and the angular velocity sensor 105 of the left controller 3.

In addition, various kinds of data required for the game processing, which are not shown, are also generated as appropriate and stored in the DRAM 85.

[Details of Processing Executed by Processor 81]

Next, the details of the game processing in the exemplary embodiment will be described. Flowcharts described below are merely an example of the processing. Therefore, the order of each process step may be changed as long as the same result is obtained. In addition, the values of variables and thresholds used in determination steps are also merely examples, and other values may be used as necessary.

Figure 17:
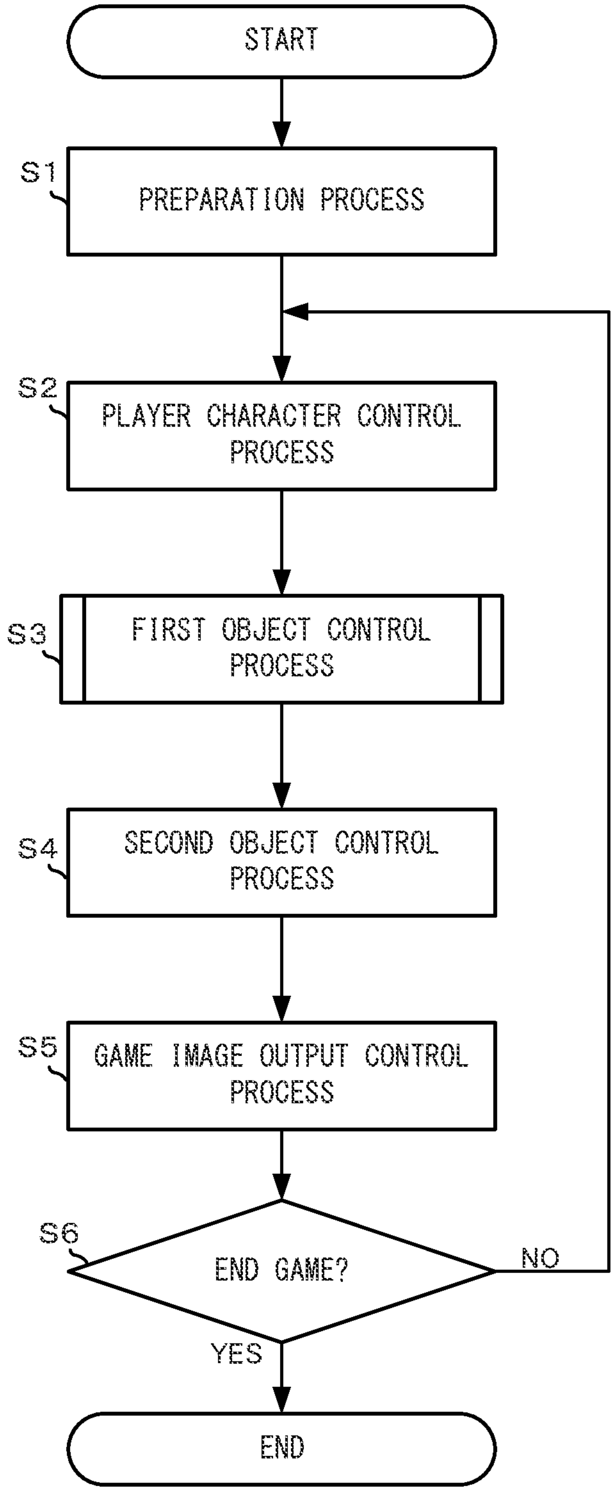
FIG. 17 is a non-limiting example flowchart showing the details of game processing according to the exemplary embodiment.

FIG. 17 is a flowchart showing the details of the game processing according to the exemplary embodiment. A process loop of steps S2 to S6 in FIG. 17 is repeatedly executed every frame period.

[Preparation Process]

First, in step S1, the processor 81 executes a preparation process for starting the game. In this process, a process of constructing a virtual three-dimensional space including a game field, and placing the PC 201, the first object 202, and a plurality of the second objects 203 in the virtual three-dimensional space, is performed. Then, a game image is generated by taking an image of the virtual space, in which various objects have been placed, with the virtual camera, and is outputted to a stationary monitor or the like. In addition, various kinds of data used for the following processes are also initialized.

[PC Control Process]

Next, in step S2, the processor 81 executes a player character control process. In this process, a process for reflecting the operation content of the player in the action of the PC 201 is performed. For example, a process of setting a movement direction and a movement speed of the PC 201 on the basis of the operation data 308, and moving the PC 201 on the basis of the setting contents, is executed.

[First Object Control Process]

Figure 18:
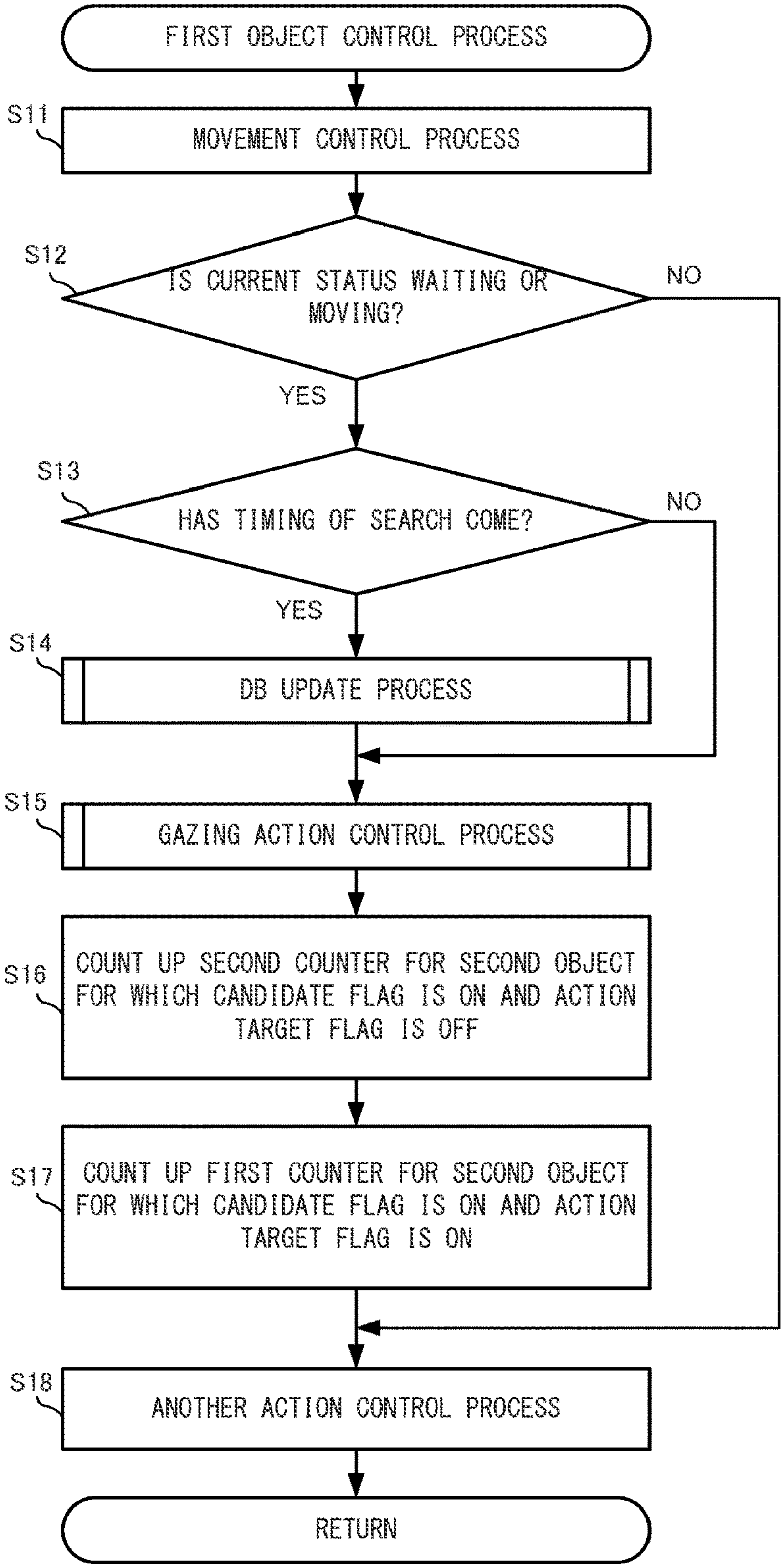
FIG. 18 is a non-limiting example flowchart showing the details of a first object control process.

Next, in step S3, the processor 81 executes a first object control process. FIG. 18 is a flowchart showing the details of the first object control process. First, in step S11, the processor 81 executes a movement control process of moving the first object 202. In the exemplary embodiment, control in which the first object 202 moves so as to follow the PC 201 is performed. In addition, various kinds of movement control, such as the case of being knocked back upon receiving an attack from an enemy object, are also performed. Moreover, for example, if the player has switched the operation target from the PC 201 to the first object 202, the movement of the first object 202 is controlled on the basis of the operation content of the player. By such movement of the first object 202, the positional relationship between the first object 202 and each second object 203 can also be changed, and the contents of the candidate database 305 can also be changed. In addition, along with the movement control process, the contents of the current position data 331 and the current posture data 332 of the first object 202 are also updated. Moreover, if the movement of the first object 202 is started from a "waiting" state, the content of the current status 333 is also updated as appropriate according to the situation, for example, the current status 333 is set to "moving". If no attack has been made and no movement has occurred, the current status 333 is set to "waiting".

Next, in step S12, the processor 81 determines whether or not the current status 333 is "waiting" or "moving". As a result of the determination, if the current status 333 is neither "waiting" nor "moving" (NO in step S12), the processor 81 advances the processing to step S18 described later.

On the other hand, if the current status 333 is "waiting" or "moving" (YES in step S12), in step S13, the processor 81 determines whether or not the timing to perform the above "search" has come. Here, as for the timing to perform the "search", in the exemplary embodiment, the "search" is performed at a cycle of 0.1 seconds. This cycle is longer than a frame rate (e.g., 60 fps). This is because the gaze control process is not required to be real time such that the gaze control process is executed every frame, and is also due to the viewpoint of reducing the processing load. However, this execution cycle is an example, and in another exemplary embodiment, the "search" process (and the following DB update process) may be executed every frame.

[Update of Candidate Database]

As a result of the above determination, if the timing to perform the "search" has come (YES in step S13), in step S14, the processor 81 executes a DB update process. This process is a process for searching for the second objects 203 around the first object 202 and updating the candidate database 305 on the basis of the results of the search.

Figure 19:
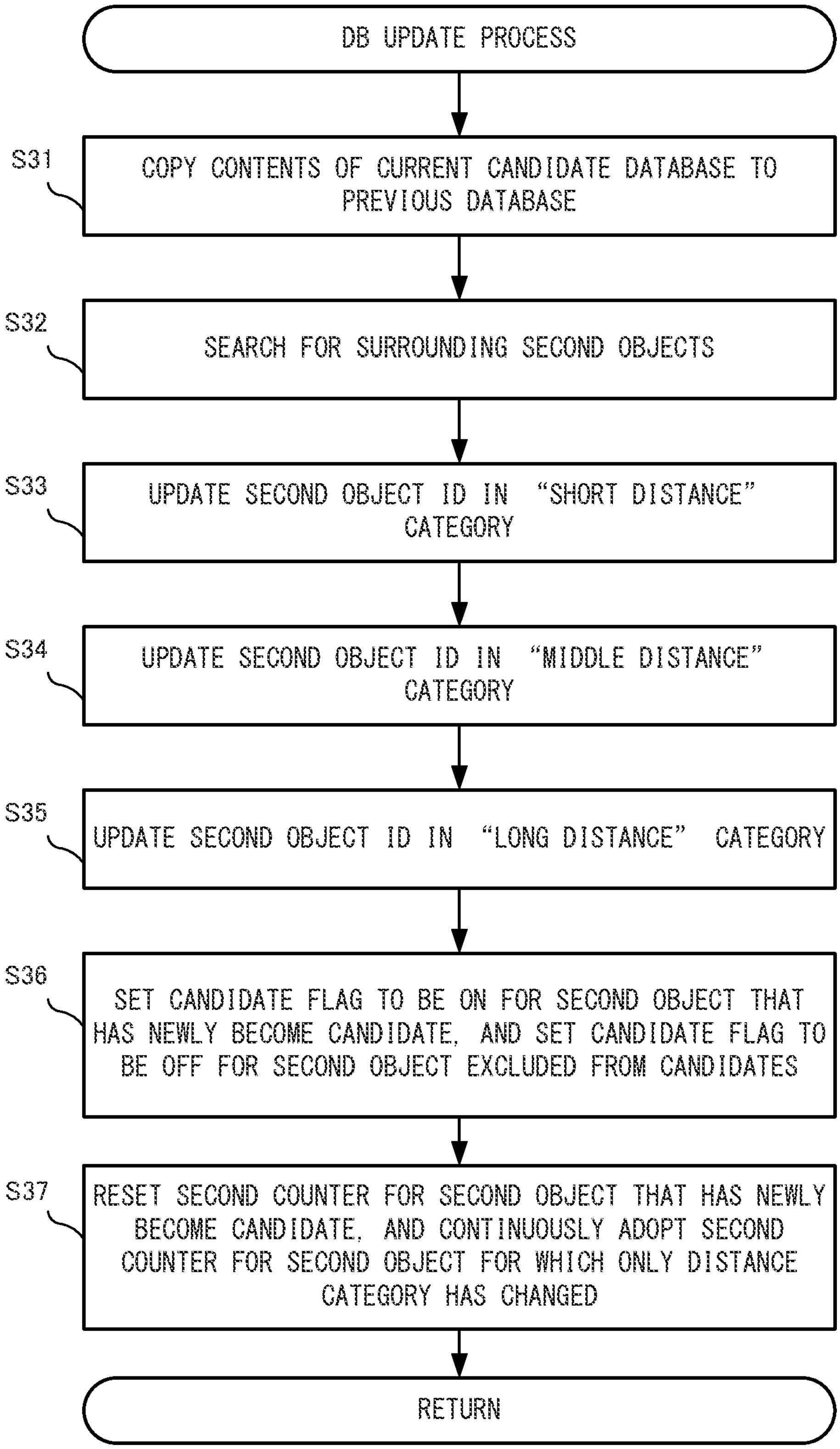
FIG. 19 is a non-limiting example flowchart showing the details of a DB update process.

FIG. 19 is a flowchart showing the details of the DB update process. In FIG. 19, first, in step S31, the processor 81 copies the contents of the current candidate database 305 to the previous database 306.

Next, in step S32, the processor 81 searches for the second objects 203 around the first object 202. Then, the processor 81 temporarily generates a list (not shown) showing the results of the search, and stores the list in the DRAM 85. The list may include, for example, the second object IDs 341 and the position information 342 of the second objects 203 found as a result of the search, as contents thereof. Alternatively, instead of the position information 342, information indicating the distance from the first object 202 may be included.

Next, in step S33, the processor 81 updates the second object ID 353 in the "short distance" category of the candidate database 305, on the basis of the above list. Specifically, the processor 81 extracts any second object 203 that exists in the field-of-view range and that exists in the "short distance" range, on the basis of the list. Whether or not the second object 203 is in the "short distance" range is determined, for example, by whether or not the linear distance from the first object 202 is equal to or less than a threshold predefined for the "short distance" range (e.g., 5 m in the virtual space). Furthermore, the processor 81 updates the second object ID 353 in the "short distance" category such that up to three objects having a shorter linear distance from the first object 202, out of the extracted second objects 203, are stored in the candidate database 305. In addition, at this this time, if the number of second objects 203 that are in the field-of-view range and that exist in the "short distance" range is less than three, a second object(s) 203 is selected from among the second objects 203 that are outside the field-of-view range and that are in the "short distance" range. Specifically, the processor 81 updates the second object ID 353 in the "short distance" category in the order of second objects 203 having a shorter linear distance among the second objects 203 that are outside the field-of-view range and that are in the "short distance" range. If the number of second objects 203 in the "short distance" range is less than three even when the outside of the field-of-view range is also checked, the processor 81 sets any record that has not been filled, to be empty.

Next, in step S34, the processor 81 updates the second object ID 353 in the "middle distance" category of the candidate database 305, on the basis of the above list. As this process, the same process as in step S33 above is performed for the "middle distance" range.

Next, in step S35, the processor 81 updates the second object ID 353 in the "long distance" category of the candidate database 305, on the basis of the above list. As this process, the same process as in step S33 above is performed for the "long distance" range.

Next, in step S36, the processor 81 compares the current candidate database 305 in which the above update is reflected, with the previous database 306. Furthermore, on the basis of the results of the comparison, the processor 81 identifies any second object 203 that has newly become a candidate object, and any second object 203 that has been excluded from the candidate objects (as a result of this update). Then, the processor 81 sets the candidate flag 344 to be ON for the second object 203 that has newly become a candidate object. In addition, the processor 81 sets the candidate flag 344 to be OFF for the second object 203 excluded from the candidate objects this time. The second object 203 for which only the distance category has changed such that, for example, the second object 203 was in the "long distance" range last time and comes to the "middle distance" range this time, has not fallen out of the state of being a candidate object, so that the candidate flag 344 remains ON for such a second object 203.

Next, in step S37, the processor 81 resets the second counter 347 for the second object 203 that has newly become a candidate object. That is, counting of the non-gazing time is started when the second object 203 newly becomes a candidate object. In addition, for the second object 203 for which only the distance category has changed as described above, the processor 81 also performs a process of continuously adopting the value (non-gazing time) of the second counter 347 as it is. That is, the processor 81 sets the value of the second counter 347 in the previous database 306 for this second object 203, in the second counter 347 in the (updated) candidate database 305.

Then, the processor 81 ends the DB update process.

[Control of Gazing Action]

Referring back to FIG. 18, next, in step S15, the processor 81 executes a gazing action control process. In this process, a process for determining the above action target from the candidate database 305 and controlling execution of the gazing action is performed.

FIG. 20 is a flowchart showing the details of the gazing action control process. In FIG. 20, first, in step S41, on the basis of a comparison between the previous database 306 and the candidate database 305, the processor 81 determines whether or not an "interrupting object" as described above exists. Specifically, the processor 81 determines whether or not the second object 203 corresponding to the first record in the "short distance" category of the candidate database 305 exists in the previous database 306. As described above, the first record in the "short distance" category is a record indicating the second object 203 closest to the first object 202. As a result of the determination, if such a second object 203 exists in the previous database 306, this second object 203 is considered to have merely changed its positional relationship with the first object 202 while remaining as a candidate object. Therefore, the second object 203 related to the first record does not correspond to an "interrupting object", and it is determined that no "interrupting object" exists. On the other hand, if such a second object 203 does not exist in the previous database 306, the second object 203 related to the first record is considered to correspond to an "interrupting object". For example, there may be a case where a first object 202 that was in the short distance range but outside the field-of-view range at the last search has entered the field-of-view range as a result of the current search. In this case, for the first object 202, this first object 202 is seen to have suddenly appeared, and thus is treated as an "interrupting object". Therefore, in this case, it is determined that an "interrupting object" exists.

As a result of the above determination, if an "interrupting object" does not exist (NO in step S41), next, in step S42, the processor 81 determines whether or not the first object 202 is executing the gazing action, on the basis of the gazing action flag 334. As a result of the determination, if the first object 202 is not executing the gazing action (NO in step S42), in step S43, the processor 81 determines the second object 203 having the longest value (non-gazing time) of the second counter 347 from the candidate database 305, as the action target. Then, the processor 81 sets the action target flag 345 of the second object 203 to be ON. Furthermore, the processor 81 sets the second object ID 341 of the determined second object 203, in the current target data 307.

Figure 21:
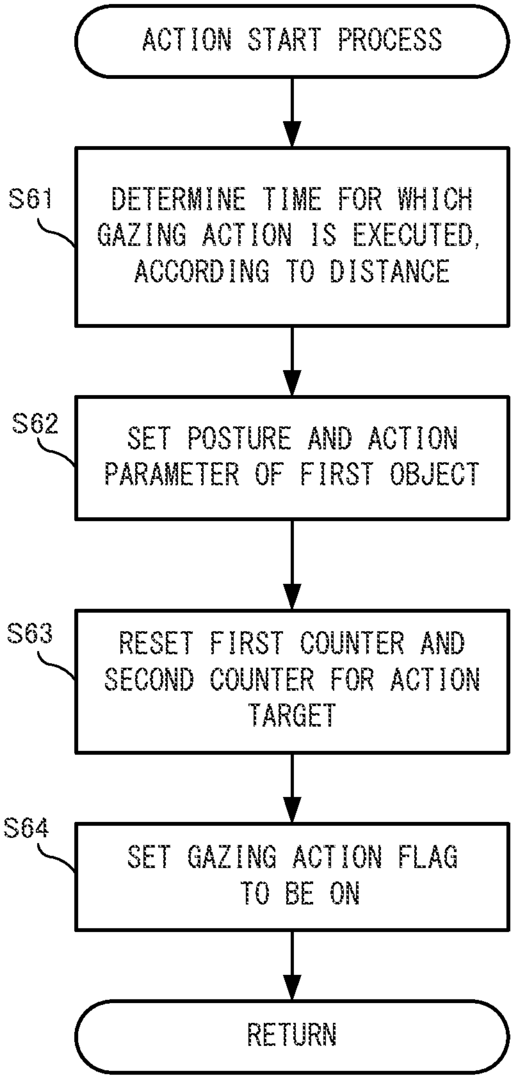
FIG. 21 is a non-limiting example flowchart showing the details of an action start process.

Next, in step S44, the processor 81 executes an action start process. This process is a process for making various settings required for executing the gazing action, when starting the gazing action. FIG. 21 is a flowchart showing the details of the action start process. First, in step S61, the processor 81 determines a time for which the gazing action is executed (hereinafter, execution time), on the basis of the distance between the action target and the first object 202. For example, the processor 81 determines the time obtained by multiplying a predefined "basic time" by the distance, as the execution time.

As the "basic time", a different time may be set for each second object 203. For example, for a second object 203 having a larger size, a longer "basic time" than that for a second object 203 having a relatively smaller size may be set. In addition, in this case, each record of the second object data 304 may be configured to have the "basic time". Moreover, in another exemplary embodiment, a "reproduction time of the animation related to the gazing action" may be treated as the "basic time".

Next, in step S62, the processor 81 sets the posture and the action parameter of the first object 202 in the execution of the gazing action. Specifically, the processor 81 sets the current posture data 332 and the action parameter 335 of the first object 202 such that the first object 202 performs an action in which the gaze of the first object 202 is directed toward the action target. For example, settings are made such that the head (face) of the first object 202 is directed toward the action target. Or, settings are made for the "eye" part of the first object 202 such that the gaze thereof is directed toward the action target. Alternatively, settings are made such that the first object 202 performs an action in which the entire body of the first object 202 is directed toward the action target.

Next, in step S63, the processor 81 resets the values of the first counter 346 and the second counter 347 for the action target. That is, the processor 81 resets the gazing time and the non-gazing time once.

Next, in step S64, the processor 81 sets the gazing action flag 334 to be ON. This is the end of the action start process.

Referring back to FIG. 20, when the action start process is ended, the processor 81 ends the gazing action control process.

Figure 22:
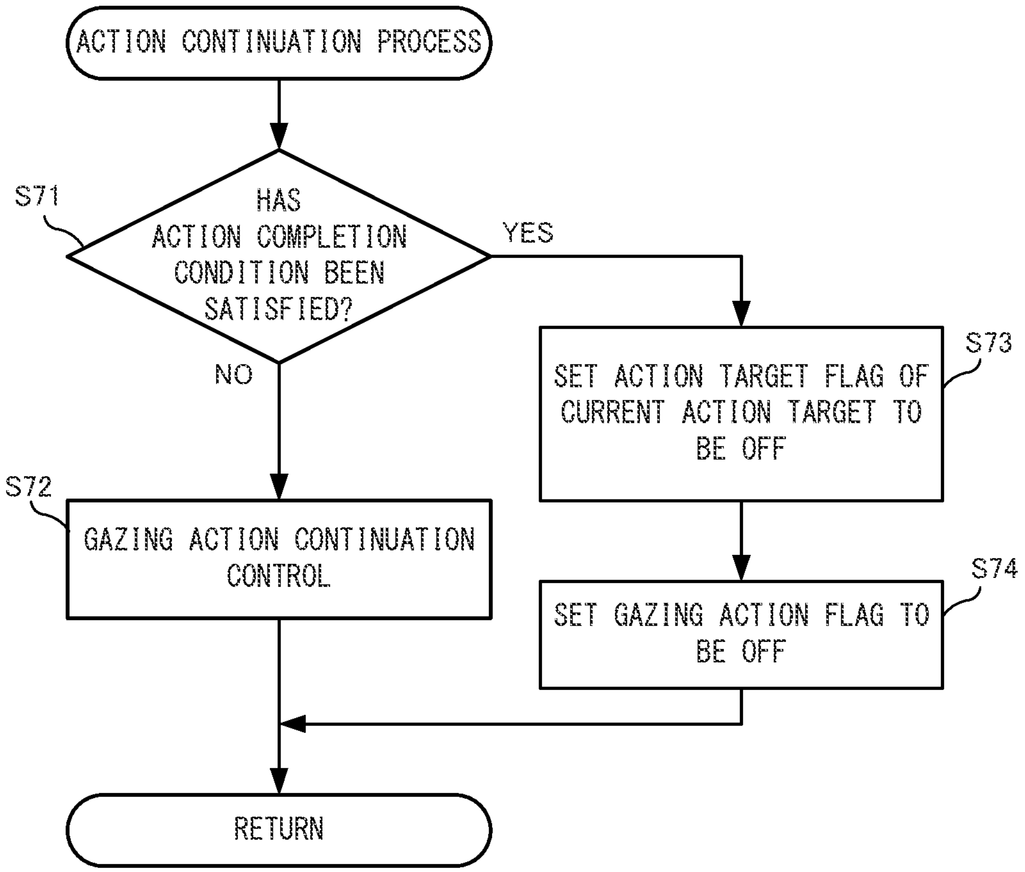
FIG. 22 is a non-limiting example flowchart showing the details of an action continuation process.

On the other hand, as a result of the determination in step S42 above, if the first object 202 is executing the gazing action (YES in step S42), in step S45, the processor 81 executes an action continuation process. FIG. 22 is a flowchart showing the details of the action continuation process. In FIG. 22, first, in step S71, the processor 81 determines whether or not an action completion condition for ending the gazing action has been satisfied. The action completion condition is the following conditions in the exemplary embodiment.

(1) The execution time has elapsed.

(2) The action target is eliminated from the candidate database 305 even before the execution time has passed.

If either of the above conditions is satisfied, it is determined that the action completion condition has been satisfied. That is, if the gaze of the first object 202 is continuously directed toward the action target for the execution time, the first object 202 ends the gazing action and directs its gaze toward another candidate object. Alternatively, before the execution time has elapsed, as a result of movement of the target object or as a result of movement of the first object 202, if a positional relationship is established such that the target object is not included in the candidate database 305, the gazing action is ended at that time.

As a result of the above determination, if the action completion condition has not been satisfied (NO in step S71), in step S72, the processor 81 causes the first object 202 to continue the motion related to the gazing action, on the basis of the action parameter 335. Then, the processor 81 ends the action continuation process.

On the other hand, as a result of the determination in step S71 above, if the action completion condition has been satisfied (YES in step S71), in step S73, the processor 81 sets the action target flag 345 of the second object 203 identified on the basis of the current target data 307, to be OFF. Subsequently, in step S74, the processor 81 sets the gazing action flag 334 to be OFF. Then, the processor 81 ends the action continuation process.

Referring back to FIG. 20, processing in the case where, as a result of the determination in step S41 above, an interrupting object exists (YES in step S41) will be described below. In this case, first, in step S46, the processor 81 determines whether or not the first object 202 is executing the gazing action, on the basis of the gazing action flag 334. As a result of the determination, if the first object 202 is executing the gazing action (YES in step S46), the current state is a state where the gazing action is being executed on a second object 203 other than the interrupting object. In this case, in step S47, the processor 81 sets the action target flag 345 of the second object 203 identified on the basis of the current target data 307, to be OFF. That is, the currently executed gazing action is interrupted.

On the other hand, if the gazing action is not being executed (NO in step S46), the process in step S47 above is skipped.

Next, in step S48, the processor 81 sets the action target flag 345 of the interrupting object to be ON. Accordingly, the interrupting object is set as the action target. As a result, the gazing action is performed on the interrupting object.

Next, in step S49, the processor 81 performs an action start process. This process is the same process as in step S44 above, and thus the description thereof is omitted.

Next, in step S50, the processor 81 copies the current candidate database 305 to the previous database 306. Accordingly, until the timing of the next search comes, it is not determined in step S41 above that an interrupting object exists. Then, the processor 81 ends the gazing action control process.

[Counting of Non-Gazing Time]

Referring back to FIG. 18, when the gazing action control process is ended, next, in step S16, the processor 81 executes a process of counting the non-gazing time. Specifically, the processor 81 counts up the second counter 347 for the second object for which the candidate flag 344 is ON and the action target flag 345 is ON.

[Counting of Gazing Time]

Next, in step S17, the processor 81 executes a process of counting the gazing time of the action target. Specifically, the processor 81 counts up the first counter 346 for the second object 203 for which the candidate flag 344 is ON and the action target flag 345 is also ON (in other words, the second object 203 identified on the basis of the current target data 307).

[Processing Based on Other Operations]

Next, in step S18, the processor 81 performs other action control related to the first object 202. That is, action control other than the above-described gaze control is performed. For example, control in which an animation corresponding to the current status 333 of the first object 202 is reproduced is performed (a running animation, an attacking action animation, etc.). Then, the processor 81 ends the first object control process.

[Action Control of Second Object]

Referring back to FIG. 17, next, in step S4, the processor 81 executes a second object control process. Specifically, the processor 81 controls various actions such as movement and attack of each second object 203 (association objects, enemy objects, etc.). For example, for an enemy object, control in which the enemy object approaches the PC 201 or the first object 202 in order to attack the PC 201 or the first object 202 can be performed. Then, by the movement of the second object 203, the positional relationship between the first object 202 and the second object 203 can also be changed. As a result, the contents of the candidate database 305 can also be changed.

[Output of Game Image]

Next, in step S5, the processor 81 executes a game image output control process. That is, the processor 81 takes an image of the virtual game space in which the above game processing is reflected, with the virtual camera to generate a game image. Then, the processor 81 outputs the game image to the stationary monitor or the like.

Next, in step S6, the processor 81 determines whether or not an end condition for the game processing has been satisfied. For example, the processor 81 determines whether or not a game end instruction operation has been performed by the player. As a result, if the end condition has not been satisfied (NO in step S6), the processor 81 returns to step S1 above and repeats the processing. If the end condition has been satisfied (YES in step S6), the processor 81 ends the game processing.

This is the end of the detailed description of the game processing according to the exemplary embodiment.

As described above, in the exemplary embodiment, the second objects 203 around the first object 202 are classified for each distance category above. In addition, for each distance category, an upper limit is set for the number of candidate objects. An action target is determined from among the candidate objects on the basis of the non-gazing time. Since there is an upper limit for the number of candidate objects in each distance category as described above, the action target can be distributed without being unevenly distributed to a certain distance category.

In the exemplary embodiment, the example in which the upper limit for the number of candidate objects in each distance category is three and the upper limit for the total number of candidates is nine, has been described. This upper limit for the number of candidates is an example, and in another exemplary embodiment, the upper limit may be another value. However, the upper limit for the total number of candidates may be set to 10 in consideration of the fact that if the number of candidate objects is excessively large, it is difficult for the player to visually recognize the distribution effect corresponding to each distance category. In addition, the upper limit for the number of candidates in each distance category may be different. For example, the upper limit for the number of candidates in the "short distance" category and the "middle distance" category may be set to three, and the upper limit for the number of candidates in the "long distance" category may be set to two.

In the exemplary embodiment, the character object representing a quadrupedal animal as a motif has been exemplified as the first object. The first object is not limited thereto, and in another exemplary embodiment, the first object may be an object representing a creature capable of performing an action of directing its gaze, as a motif. Alternatively, the first object may be an inanimate object such as a robot having a camera, for example. Furthermore, the field-of-view range may be changed according to the motif of the object, etc. The example in which the angle corresponding to the field of view is 180 degrees has been described above, but this angle is not limited thereto, and a range having an angle such as 150 degrees or 120 degrees may be set as the field-of-view range. For example, in the case where the motif is carnivores and herbivores, different field-of-view ranges may be used.

Figure 23:
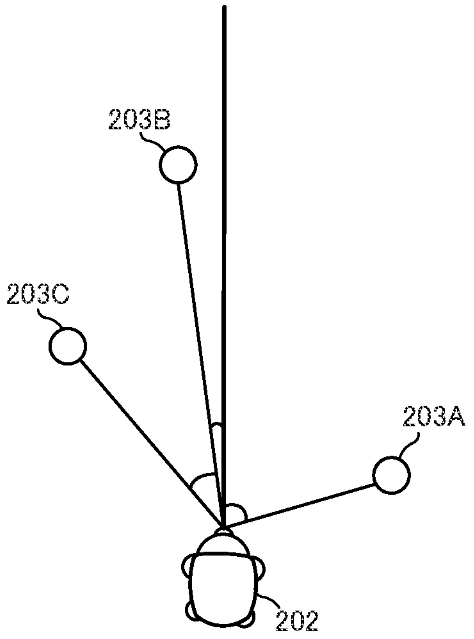
FIG. 23 illustrates a modification of candidate object selection.

As for the selection of the above candidate objects, the example in which objects having a shorter linear distance from the first object 202 are preferentially selected has been described above. In another exemplary embodiment, for example, as shown in FIG. 23, the second object 203 for which an angle between a straight line extending in the forward direction (front direction) of the first object 202 and a straight line extending from the first object 202 toward the second object 203 is smaller may be preferentially selected. In the example in FIG. 23, this angle is smaller for a second object 203B than for second objects 203A and 203C, and thus the second object 203B can be preferentially selected as a candidate object.

In another exemplary embodiment, the position of the first object 202 may be fixed, or the movable range (range of action) of the first object 202 may be limited. In this case, each second object 203 may be classified on the basis of the location or area where the second object 203 is located, without calculating the distance between the first object 202 and the second object 203. For example, it is assumed that the first object 202 exists in the air, a second object 203A is on water, and a second object 203B is in the water. In this case, the second object 203A on the water may be classified into "middle distance", and the second object 203B in the water may be classified into "long distance".

In another exemplary embodiment, contrary to the above, the position of each second object 203 may be fixed, or the range of action thereof may be limited. In this case, each second object 203 may be classified on the basis of the location or area where the first object 202 is located.

In still another exemplary embodiment, using the average value of the distances between the first object 202 and the second objects 203 that exist in a predetermined range, each second object 203 may be classified. For example, the case where only two ranges of "short distance" and "long distance" are used for the distance category is assumed. In this case, the above average value may be used as a threshold, and if the distance between the first object 202 and the second object 203 is equal to or larger than the average value, the second object 203 may be classified into "long distance", and if the distance between the first object 202 and the second object 203 is less than the average value, the second object 203 may be classified into "short distance".

As for the process of determining the action target, if there are a plurality of candidate objects having the same non-gazing time, control in which the candidate object having a shorter distance to the first object 202 is preferentially determined as the action target may be performed.

Also, as for the process of determining the action target, in the above embodiment, the candidate object having the longest non-gazing time is determined as the action target. In another exemplary embodiment, in this determination, control in which randomness is provided may be performed. For example, the action target itself may be determined by a random selection process, and control in which the rate of selection of a candidate object having a longer non-gazing time is made higher may be performed.

In another exemplary embodiment, when determining the action target, the candidate object on which the gazing action has not been executed may be preferentially determined. In this case, information of the second object 203 on which the gazing action has been executed may be stored as an execution history. For example, if it is determined in step S71 in FIG. 22 above that the action completion condition has been satisfied, a process of registering information that identifies the action target at that time, in the above execution history may be performed. Then, when determining the action target in step S43 in FIG. 20 above, a process of referring to the execution history and preferentially determining a second object 203 that is not registered in the execution history, as the action target may be performed. Furthermore, when determining the action target from the second objects 203 that are not registered in the execution history, the second object 203 closer to the first object 202 may be preferentially determined. As for each second object 203 registered in the execution history, when the second object 203 is eliminated from the candidate database 305, the second object 203 may also be deleted from the execution history.

As for the determination of the action target, for example, if ally characters and enemy characters coexist as second objects, an enemy character may be preferentially determined as the action target.

Also, the second objects are not limited to the above-described (movable) character objects, and may be inanimate object such as items, for example.

As for the timing to count the non-gazing time, in the above example, the non-gazing time is reset (actually, the counting is stopped) at the timing when the gazing action starts. The example of the process in which counting of the non-gazing time is started again at the timing when the gazing action ends (timing of being no longer the action target) has been described. That is, the example in which the timing when the gazing action ends is used as a reference timing and the elapsed time from that timing is treated as the non-gazing time, has been described. In addition, the timing when the gazing action starts may be used as a reference timing, and, on the basis of the reference timing, the non-gazing time may be reset and counting of the non-gazing time may be started again.

In the above embodiment, the action of "directing the gaze" has been exemplified as the action performed on the second object 203 by the first object 202. In another exemplary embodiment, as this action, another action may be performed. For example, an action of "barking" may be performed. In addition, for example, a "long distance attack (shooting, etc.)" may be performed as this action.

Depending on the content of the action executed by the first object 202, the same second object may be successively determined as the action target. For example, in the case of the above action of "barking", the action of "barking" may be performed successively three to five times on the same second object 203. Accordingly, the first object 202 can be caused to perform an action of continuously barking at the same object. After the action is executed a predetermined number of times, another candidate object may be determined as the action target.

In the above embodiment, the data structure is configured to have the second counter 347 (non-gazing time) for each second object 203. The process of resetting the second counter 347 at the timing when a second object 203 is newly registered in the candidate database 305 has been described as an example. That is, the process of recounting the non-gazing time if the same second object 203 is registered once in the candidate database 305, then deregistered, and then registered again, has been described as an example. In this regard, in another exemplary embodiment, the second counter 347 may not necessarily be reset at the timing of being registered in the candidate database 305. That is, for each second object 203, until the gazing action is performed on the second object 203, a process of continuously adopting the non-gazing time regardless of whether the second object 203 is registered or deregistered in the candidate database 305 may be performed.

As for the above "interrupting object", in another exemplary embodiment, after it is determined once that an "interrupting object" exists, control in which no other "interrupting object" appears for a certain time may be performed. For example, if it is determined that an "interrupting object" exists, control in which no second object 203 moves into the field-of-view range for 5 seconds after this determination may be performed. Alternatively, no movement limit or the like may be set, and until the gazing action on the interrupting object is ended, the process of determining the presence of an "interrupting object" as described above (step S41) may not necessarily be performed. Accordingly, the first object 202 can be prevented from behaving such that the neck thereof moves violently as a result of "interrupting objects" successively appearing in a short time, and the first object 202 can be caused to behave in a more natural manner.

In the above embodiment, as for the counting of the execution time, the example of counting up the gazing time (first counter 346) of the action target has been described. In addition, in another exemplary embodiment, a process of counting down until the execution time reaches 0 may be performed. In this case, when the execution time is determined, the first counter 346 may be set so as to have the determined execution time. A process of counting down the first counter 346 until the first counter 346 reaches 0 from the timing when the gazing action is started may be performed.

In the above embodiment, the case where the series of processes related to the game processing is performed in the single main body apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a player's operation to a predetermined server, and the server may be configured to execute various kinds of game processing and stream the execution results as video/audio to the main body apparatus 2.

While the present disclosure has been described in detail, the foregoing description is in all aspects illustrative of the present disclosure and not restrictive. It is to be understood that numerous other modifications and variations can be devised without departing from the scope of the present disclosure.

What is claimed is:

1. A non-transitory computer-readable storage medium having stored therein a game program executed in a computer of an information processing apparatus, the game program, when executed, causes the computer to provide execution comprising:

placing a first object and a plurality of second objects in a virtual space;

processing user input for causing the first object to perform an action with a target;

determining one or more second objects located in a first range relatively close to the first object and one or more second objects located in a second range relatively far from the first object among the plurality of second objects, as candidate objects that are target candidates of the action performed by the first object with the target being switched according to passage of time;

distributing gazing points associated with the one or more second objects located in the first range and the second range, wherein the gazing points relate to a gaze of the first object, and a number of gazing points, associated with the one or more second objects located in the first range and the second range, is less than or equal to a specified amount;

in association with, among the candidate objects, a first number of first candidate objects being located in the first range, and a second number of second candidate objects being located in the second range, causing the first object to perform the action in one of the following manners:

a first manner in which, before the first object is caused to perform the action with a second candidate object as a target, the first object is caused to perform the action with a first candidate object as a target such that the number of times the action is performed is equal to or less than the first number, and then the first object is caused to perform the action, with the second candidate object as a target, in which the gaze of the first object is directed toward the target, and a second manner in which, before the first object is caused to perform the action with the first candidate object as a target, the first object is caused to perform the action with the second candidate object as a target such that the number of times the action is performed is equal to or less than the second number, and then the first object is caused to perform the action, with the first candidate object as a target, in which the gaze of the first object is directed toward the target; and generating a display image for displaying, on a screen, the virtual space including the first object, wherein the first object performs the action in which the gaze of the first object is directed toward the target.

2. The storage medium according to claim 1, wherein when causing the first object to perform the action, the game program causes the computer to provide execution comprising:

associating, with each of the second objects, a timing after a timing when the action is started on a second object and before a timing when the action is next started on another second object, as a reference timing, and preferentially setting the second object having a longer time elapsed from the reference timing, as the target of the action.

3. The storage medium according to claim 1, wherein when causing the first object to perform the action, the game program causes the computer to provide execution comprising:

storing a second object including at least a candidate object targeted for the action, until the second object is no longer included in the candidate objects, and setting the second object that has not been targeted for the action, as the target of the action in preference to the second object that has been targeted for the action.

4. The storage medium according to claim 3, wherein when causing the first object to perform the action, the game program causes the computer to provide execution comprising preferentially setting the second object closer to the first object among the second objects that have not been targeted for the action, as the target of the action.

5. The storage medium according to claim 1, wherein the game program causes the computer to provide execution comprising causing the first object to perform the action on the first candidate object located closest to the first object and newly included in the first range from a state where the first candidate object is not included in the first range or the second range, when the first candidate object becomes newly included in the first range.

6. The storage medium according to claim 1, wherein when determining the candidate objects, the game program causes the computer to provide execution comprising: determining, for each of the first range and the second range, a second object for which an angle between a forward direction of the first object and a direction from a position of the first object toward a position of the second object is smaller, as the candidate object in preference to the second object for which the angle is larger.

7. The storage medium according to claim 1, wherein when determining the candidate objects, the game program causes the computer to provide execution comprising: determining, for each of the first range and the second range, a second object that exists in a region extending at a predetermined angle so as to include a forward direction of the first object, as the candidate object in preference to the second object that does not exist in the region.

8. The storage medium according to claim 7, wherein when determining the candidate objects, the game program causes the computer to provide execution comprising for each of the first range and the second range, determining the second object closer to the first object among the second objects that exist in the region, as the candidate object in preference to the second object farther from the first object.

9. The storage medium according to claim 1, wherein the first object is an object including at least a body, a face, or eyes, and when causing the first object to perform the action, the game program causes the computer to provide execution comprising causing the first object to perform, with the first candidate object or the second candidate object as the target, the action in which the body, the face, or the gaze of the first object is directed toward the target.

10. The storage medium according to claim 1, wherein when causing the first object to perform the action, the game program causes the computer to provide execution comprising restricting the first object from successively performing the action on a same second object.

11. The storage medium according to claim 1, wherein when causing the first object to perform the action, the game program causes the computer to provide execution comprising causing the first object to successively perform the action in the first manner, with one of the first candidate objects as the target, a number of times that is equal to or less than the first number.

12. The storage medium according to claim 1, wherein when determining the candidate objects, the game program causes the computer to provide execution comprising determining the second objects whose number is equal to or less than 10, as the candidate objects.

13. The storage medium according to claim 1, wherein when causing the first object to perform the action, the game program causes the computer to provide execution comprising determining the second objects as the candidate objects such that the first number and the second number are equal to each other.

14. The storage medium according to claim 13, wherein the game program further causes the computer to provide execution comprising changing a position of the first object placed in the virtual space.

15. The storage medium according to claim 14, wherein the game program causes the computer to provide execution comprising, when changing the position of the first object, changing the position of the first object such that the first object follows a player character operated by a player.

16. The storage medium according to claim 1, wherein the game program further causes the computer to provide execution comprising changing positions of the second objects placed in the virtual space.

17. The storage medium according to claim 1, wherein the game program causes the computer to provide execution comprising determining the candidate objects every predetermined cycle.

18. A game apparatus, comprising:

processing circuitry including at least one processor, wherein the processing circuitry is configured to:

place a first object and a plurality of second objects in a virtual space;

process user input for causing the first object to perform an action with a target;

determine one or more second objects located in a first range relatively close to the first object and one or more second objects located in a second range relatively far from the first object among the plurality of second objects, as candidate objects that are target candidates of the action performed by the first object with the target being switched according to passage of time;

distribute gazing points associated with the one or more second objects located in the first range and the second range, wherein the gazing points relate to a gaze of the first object, and a number of gazing points, associated with the one or more second objects located in the first range and the second range, is less than or equal to a specified amount;

when, among the candidate objects, a first number of first candidate objects are located in the first range, and a second number of second candidate objects are located in the second range, cause the object to perform the action in one of the following manners:

a first manner in which, before the first object is caused to perform the action with a second candidate object as a target, the first object is caused to perform the action with a first candidate object as a target such that the number of times the action is performed is equal to or less than the first number, and then the first object is caused to perform the action, with the second candidate object as a target, in which the gaze of the first object is directed toward the target, and a second manner in which, before the first object is caused to perform the action with the first candidate object as a target, the first object is caused to perform the action with the second candidate object as a target such that the number of times the action is performed is equal to or less than the second number, and then the first object is caused to perform the action, with the first candidate object as a target, in which the gaze of the first object is directed toward the target; and generate a display image for displaying, on a screen, the virtual space including the first object, wherein the first object performs the action in which the gaze of the first object is directed toward the target.

19. A game system, comprising:

a processor; and a memory configured to store computer readable instructions that, when executed by the processor, cause the game system to:

place a first object and a plurality of second objects in a virtual space;

process user input for causing the first object to perform an action with a target;

determine one or more second objects located in a first range relatively close to the first object and one or more second objects located in a second range relatively far from the first object among the plurality of second objects, as candidate objects that are target candidates of the action performed by the first object with the target being switched according to passage of time;

distribute gazing points associated with the one or more second objects located in the first range and the second range, wherein the gazing points relate to a gaze of the first object, and a number of gazing points, associated with the one or more second objects located in the first range and the second range, is less than or equal to a specified amount;

when, among the candidate objects, a first number of first candidate objects are located in the first range, and a second number of second candidate objects are located in the second range, cause the object to perform the action in one of the following manners:

a first manner in which, before the first object is caused to perform the action with a second candidate object as a target, the first object is caused to perform the action with a first candidate object as a target such that the number of times the action is performed is equal to or less than the first number, and then the first object is caused to perform the action, with the second candidate object as a target, in which the gaze of the first object is directed toward the target, and a second manner in which, before the first object is caused to perform the action with the first candidate object as a target, the first object is caused to perform the action with the second candidate object as a target such that the number of times the action is performed is equal to or less than the second number, and then the first object is caused to perform the action, with the first candidate object as a target, in which the gaze of the first object is directed toward the target; and generate a display image for displaying, on a screen, the virtual space including the first object, wherein the first object performs the action in which the gaze of the first object is directed toward the target.

20. A game processing method executed by a computer configured to control an information processing apparatus, the game processing method comprising:

placing a first object and a plurality of second objects in a virtual space;

processing user input for causing the first object to perform an action with a target;

determining one or more second objects located in a first range relatively close to the first object and one or more second objects located in a second range relatively far from the first object among the plurality of second objects, as candidate objects that are target candidates of the action performed by the first object with the target being switched according to passage of time;

distributing gazing points associated with the one or more second objects located in the first range and the second range, wherein the gazing points relate to a gaze of the first object, and a number of gazing points, associated with the one or more second objects located in the first range and the second range, is less than or equal to a specified amount;

in association with, among the candidate objects, a first number of first candidate objects being located in the first range, and a second number of second candidate objects being located in the second range, causing the object to perform the action in one of the following manners:

a first manner in which, before the first object is caused to perform the action with a second candidate object as a target, the first object is caused to perform the action with a first candidate object as a target such that the number of times the action is performed is equal to or less than the first number, and then the first object is caused to perform the action, with the second candidate object as a target, in which the gaze of the first object is directed toward the target, and a second manner in which, before the first object is caused to perform the action with the first candidate object as a target, the first object is caused to perform the action with the second candidate object as a target such that the number of times the action is performed is equal to or less than the second number, and then the first object is caused to perform the action, with the first candidate object as a target, in which the gaze of the first object is directed toward the target; and generating a display image for displaying, on a screen, the virtual space including the first object, wherein the first object performs the action in which the gaze of the first object is directed toward the target.

* * * * *